INVENTOR.
JOHN G. WILLIAMS
BY
Bussery Harding
ATTORNEYS

July 19, 1955   J. G. WILLIAMS   2,713,556
LIQUID FLOW CONTROL APPARATUS
Filed Sept. 17, 1949   11 Sheets-Sheet 2
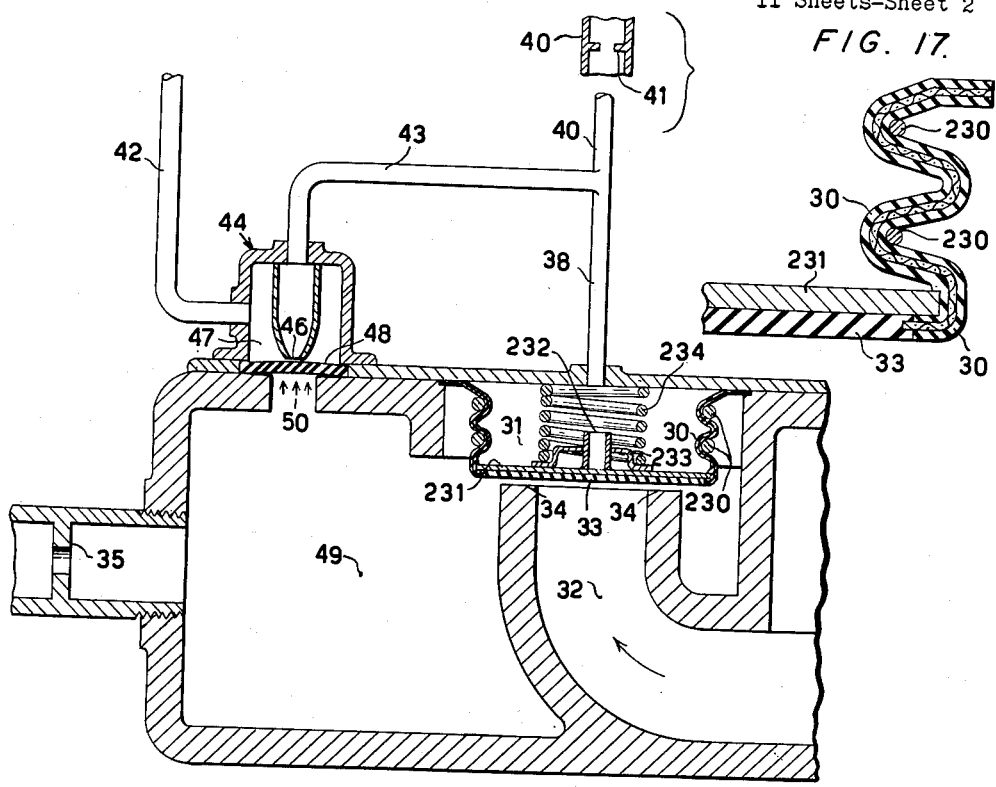
FIG. 17.
FIG. 2.
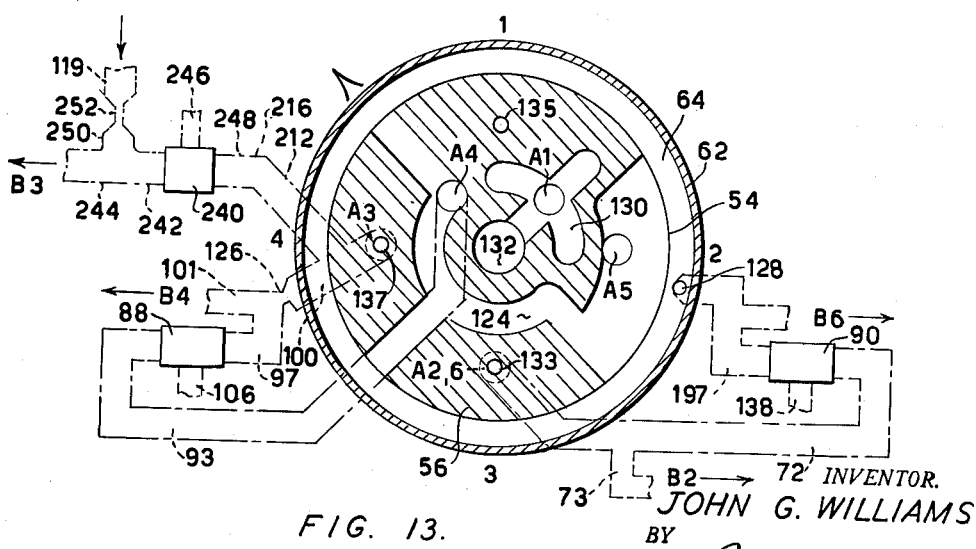
FIG. 13.
INVENTOR.
JOHN G. WILLIAMS
BY
Burnett Harding
ATTORNEYS July 19, 1955   J. G. WILLIAMS   2,713,556
LIQUID FLOW CONTROL APPARATUS
Filed Sept. 17, 1949   11 Sheets-Sheet 3

INVENTOR.
JOHN G. WILLIAMS
BY
ATTORNEYS

July 19, 1955  J. G. WILLIAMS  2,713,556
LIQUID FLOW CONTROL APPARATUS
Filed Sept. 17, 1949  11 Sheets-Sheet 4

INVENTOR.
JOHN G. WILLIAMS
BY
ATTORNEYS

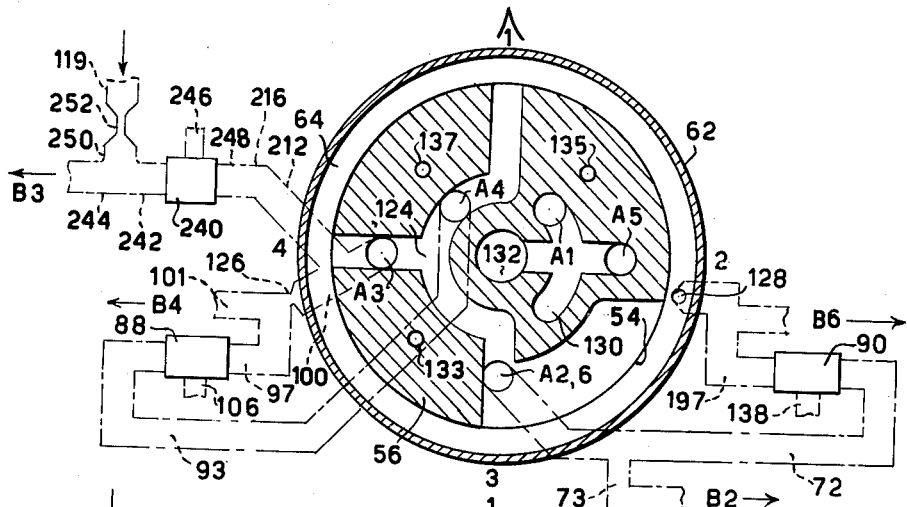
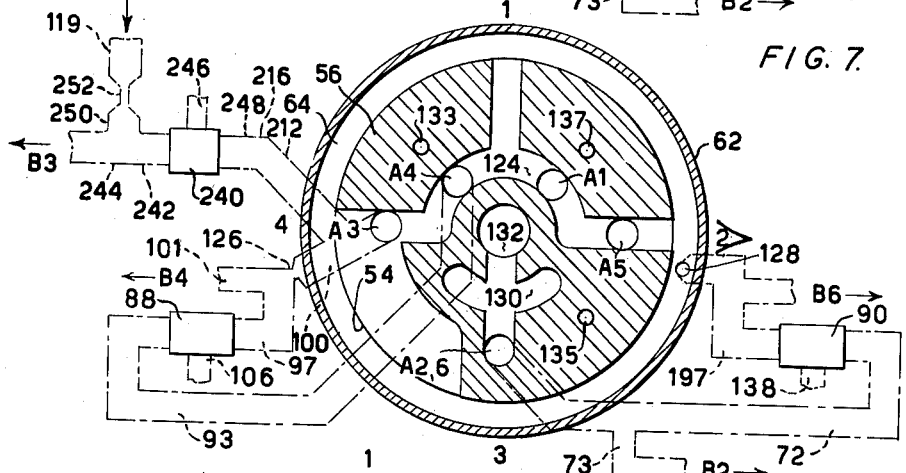
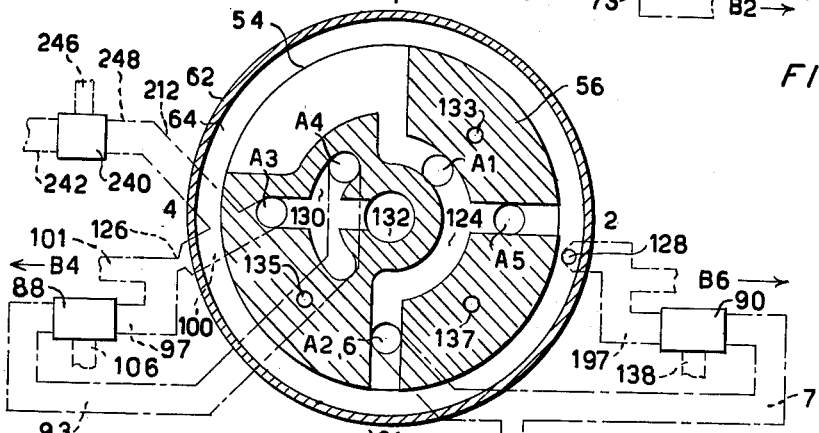

July 19, 1955  J. G. WILLIAMS  2,713,556
LIQUID FLOW CONTROL APPARATUS
Filed Sept. 17, 1949  11 Sheets-Sheet 6

INVENTOR.
JOHN G. WILLIAMS
BY
ATTORNEYS

July 19, 1955

J. G. WILLIAMS 2,713,556

LIQUID FLOW CONTROL APPARATUS

Filed Sept. 17, 1949

INVENTOR.
JOHN G. WILLIAMS
BY
ATTORNEYS

July 19, 1955    J. G. WILLIAMS    2,713,556
LIQUID FLOW CONTROL APPARATUS
Filed Sept. 17, 1949    11 Sheets-Sheet 8

INVENTOR.
JOHN G. WILLIAMS
BY
ATTORNEYS

July 19, 1955

J. G. WILLIAMS 2,713,556

LIQUID FLOW CONTROL APPARATUS

Filed Sept. 17, 1949

INVENTOR.
JOHN G. WILLIAMS
BY
ATTORNEYS.

INVENTOR.
JOHN G. WILLIAMS

United States Patent Office 2,713,556
Patented July 19, 1955

2,713,556

LIQUID FLOW CONTROL APPARATUS

John G. Williams, Philadelphia, Pa., assignor to Cochrane Corporation, a corporation of Pennsylvania Application September 17, 1949, Serial No. 116,264

15 Claims. (Cl. 210—24)

This invention relates to a liquid control valve assembly and a method and apparatus for the control and operation of liquid handling equipment such as ion exchange or filtration equipment and the like.

In ion exchange, filtration, and other types of liquid treating equipment it is generally necessary to recondition the contents of the treatment tank at periodic intervals. The steps involved in reconditioning generally include operations of flushing or washing and the application of a regenerant.

In ion exchange systems involving either acid or alkali treatment the liquid treating materials, after a period of use, become deactivated and require regeneration. Briefly, in ion exchange equipment regeneration involves a sequence of backwashing wherein water is passed through the ion exchange material container as a reverse flush and then to waste or drain; regenerating wherein a regenerating solution is passed through the ion exchange material container and then to drain; and rinsing whereby fresh water is passed through the ion exchange container washing the residual regenerant solution from the ion exchange material container to drain. After regeneration the system is restored to service connections for normal operation.

In filtration equipment of the type characterized by employing supplementary floccular adsorbent or absorbent beds the sequence of reconditioning generally employs the operations of backwashing wherein water is passed through the filtration bed as a reverse flush and thence to drain; reconditioning wherein a suspension carrying a floc such as an aluminum hydroxide or other material is passed into the filter bed reestablishing the layer of floccular material on the surface of the bed, the liquid carrier passing to drain; and rinsing whereby the residual reconditioning suspension fluid is washed from the filtration bed to drain, leaving only the insoluble material in the filter. After reconditioning the system is restored to service connection for normal operation.

It should be noted that throughout this disclosure the word "regeneration" will be used as applying to both regeneration of ion exchange materials and reconditioning of filter beds.

In ordinary filtration equipment employing agitation but not requiring a chemical regenerant solution the regenerating operations generally include the steps of agitation wherein water is passed to a surface agitating means for the purpose of stirring up materials deposited on and in the surface of the filtration bed; backwashing wherein the water is passed through the filter as a reverse flush to remove or pass to drain the materials which have settled thereon; and rinsing whereby water is passed through the filter in a normal direction and to drain in order to settle and flush the filter bed in preparation for service. After regeneration the system is restored to service connection for normal operation.

These systems of liquid treatment involve establishing and controlling connections between a treatment tank, a regenerant tank or an agitator, a raw liquid supply, a drain line and a treated liquid service line. The present invention has to do with an improved type of control valve whereby these connections are effected.

There are available numerous single control valve assemblies designed for these general purposes, all of which are found to have manufacturing or operating handicaps. The single control valves which have been successfully reduced to practice may be divided into three general types characterized by their manner of operation. The first type might be most properly called the sliding port type of valve of which the cylindrical plug valve, the conical plug valve and the flat face rotary disc valve are examples. The second type might be called the lifting valve type in which an axially movable part including a reversing channel is lifted clear of a multiplicity of valve port seats, rotated to a new position and reseated. A third type might be described as an individual valve type in which individually seating valves are either directly manually or hydraulically operated in a pattern or sequence to accomplish a desired flow cycle.

The first mentioned sliding port type valve has been found objectionable on several counts. In the cylindrical form it is expensive to manufacture and nearly impossible to make liquid-tight. In the conical form it is expensive to manufacture and very difficult to unseat to permit turning, under the influence of high water pressures. In the flat disc form, usually rubber faced, it is very difficult to turn under high operating differentials, it requires supplementary grease lubrication and it is characteristically leaky. In all forms the sliding port type valve has the objection that in intermediate valve positions there exists a promiscuous interconnection of all of the ports in the valve body. In a valve of this type this fault could only be avoided by making the land areas between ports extremely large and the valve body ridiculously large and expensive.

The second type of single control valve utilizing a single lifting valve member including a reversing chamber or passage has the objection that it is nearly impossible to operate in larger sizes against high water pressure and in all sizes causes a substantial and objectionable line shock as a result of its characteristic sudden closing. It also has the fault common to the sliding port type valve that in any intermediate changeover position, when the valve plate is lifted from its seat, there exists a promiscuous interconnection of all fluid lines connecting to the valve assembly.

Previous to the invention of the valve disclosed herein there has not existed a single control valve of the individually operated valve unit type enclosing in a single unitary assembly of reasonable size an adequate number of valve units suitable for controlling any of the aforesaid liquid treatment systems.

It is an object of this invention to provide a liquid control valve assembly for this type of service which will have the advantages of ease of operation under high liquid pressure differential, independently sequenced opening and closing of the individual ports in the valve during the process of changing the valve position, individually seating valve units operated from a central pilot valve and contained in a single valve, and a compact easily operated pilot valve assembly which requires no supplementary lubrication.

Another object of this invention is to provide a bellows type of valve, or alternatively a type of piston valve, having more desirable operating characteristics and longer life than the diaphragm type of valve heretofore employed in liquid handling systems.

Heretofore it has been customary to employ in liquid handling systems control valves which have four positions of operation and to control only the four steps or stages of operation, namely, service, backwash, regenerate and rinse; or in case of filtration systems, the operations of service, agitate, backwash and rinse.

A further object of this invention is to provide an improved type of valve whereby, in addition to these conventional control positions, it is also possible to accomplish one or more of the following:

(1) A control valve position in which the valve will shut off all connections in the system as an emergency quick shut-off.

(2) A control valve position in which the valve will shut off all connections in the system except the drain which allows drainage of the liquid treatment tank.

(3) A control valve position in which the valve will shut off all connections in the system except the liquid supply to the treatment tank. This position offers utility for standby service where one of a plurality of jointly connected liquid treatment tanks may be made to stand by under pressure without offering service to the line.

A further object of this invention is to provide a liquid control valve assembly of a reduced size, weight and cost by the utilization of individually acting valve components having relatively high effective area values in relation to their maximum diameter thereby providing maximum flow passage area per unit of space as compared to previous designs utilizing single diaphragm type of valves and having completely friction-free operation by the utilization of multiple convolution sealed bellows valve members molded from an elastic corrosion-resistant material.

It is another object of this invention to provide a pilot operated multi-port bellows control valve assembly wherein the pilot system operates on selected liquid so that the regenerating solutions are kept from contact with the pilot valve assembly.

It is generally desirable to accomplish a backwash with a reasonably high rate of flow having sufficient force to dislodge and remove various solid particles which may have been carried into the treatment tank with the untreated liquid. In the case of the regenerating operation, it is necessary to adjust for a lesser rate of flow and maintain that rate quite accurately in order to provide to the treatment tank a uniformly distributed flow of a predetermined quantity of a regenerant solution of the proper concentration during a predetermined interval of time. In conventional control valve mechanisms the flow rates in the regeneration cycle are controlled by means of a float operated valve and a weir orifice. The fact that such devices are costly to install and require valuable space is quite obvious. It should also be noted that the float operated valve and weir orifice type of rate control starts in operation with the valve wide open and does not effect control until a sufficient volume of liquid is accumulated ahead of the weir to properly condition the control float. Therefore, they do not provide immediate flow rate regulation.

It is, therefore, another object of this invention to provide inexpensive, compact, accurate and independent flow rate controls instantaneously effected and operated during the backwash, regenerating and rinsing operations by regulating the pressure of the operating fluid within the bellows valve relative to the pressure of the liquid passing the valve thereby maintaining an accurate and steady control of the flow rate past the bellows valve.

It is another object of this invention to provide a liquid control valve assembly containing a multiplicity of valve units, a pilot valve assembly and pressure regulating units constructed and arranged to provide accessibility for service or replacement of any of the elements contained therein without breaking any of the pipe connections to the main valve body.

A further object of the invention is to provide an automatic system of preparation and measurement of a quantity of regenerant solution in anticipation of a demand for regeneration of the treating materials in a liquid treatment tank or any one of a number of liquid treatment tanks.

These and other objects of this invention, particularly relating to details of construction and operation, will become apparent from the following description, read in conjunction with the accompanying drawings, in which:

Figure 2 is a schematic representation of a section of the bellows valve showing the principles of the structure involved in the flow rate regulation;

Figure 4:
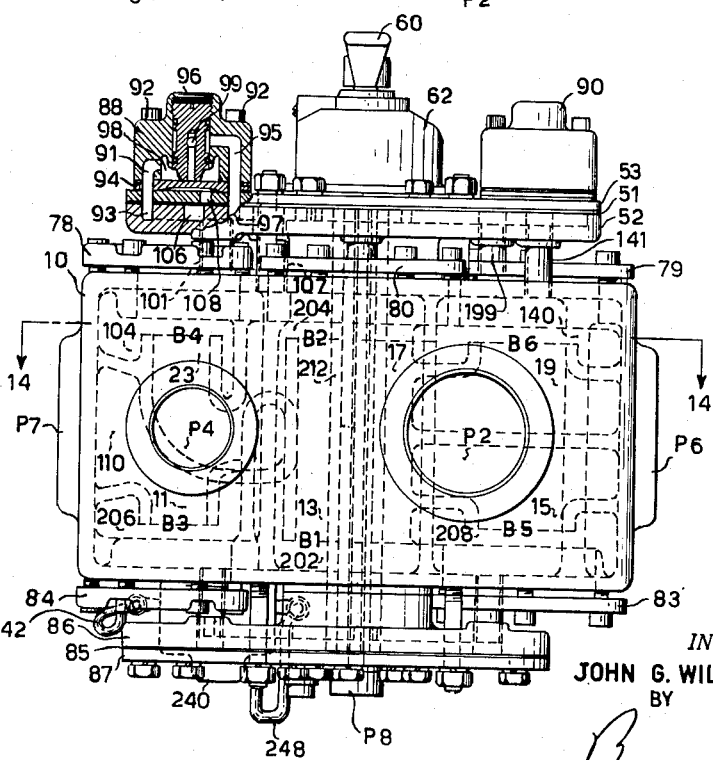
Figure 4 is a bottom plan view of the valve assembly including a section of the rate regulator taken on the plane 4—4 through the regulator as indicated in Figure 3.
Figure 14:
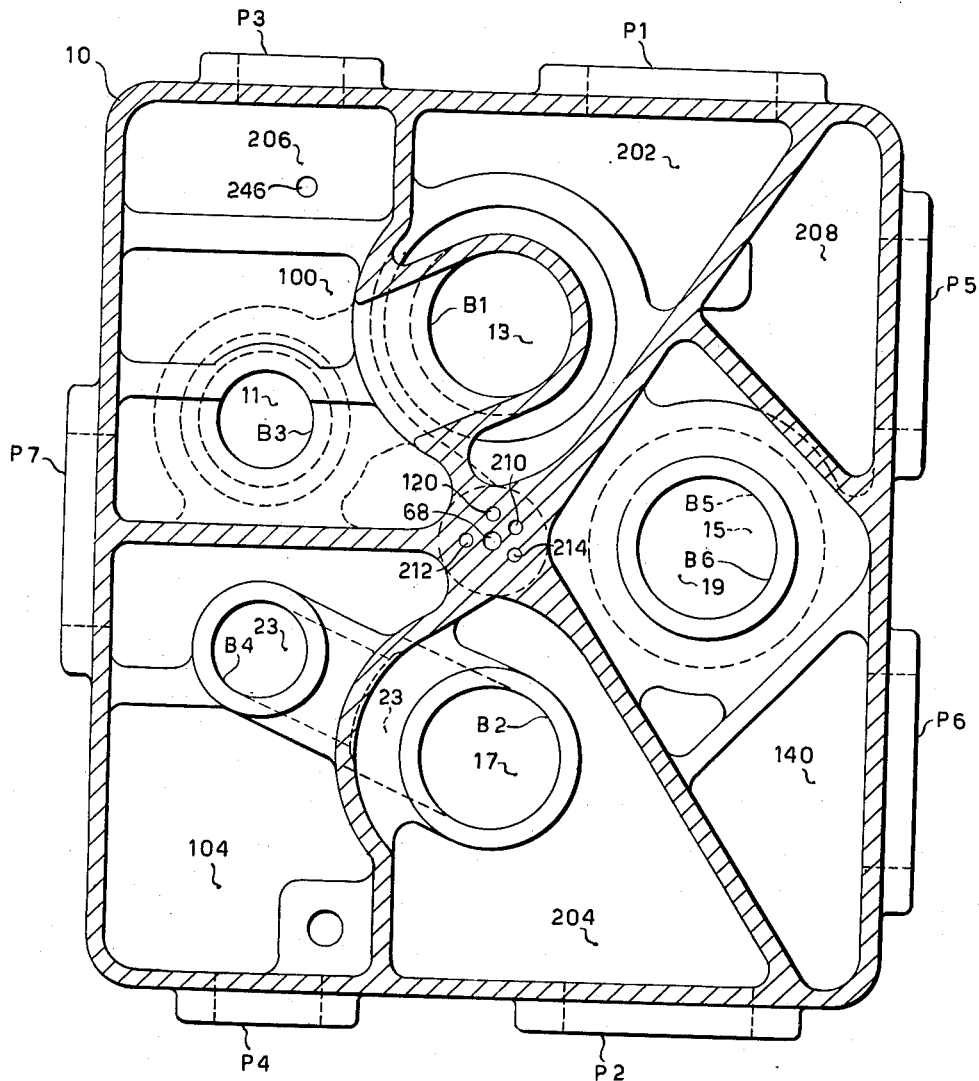
Figure 15:
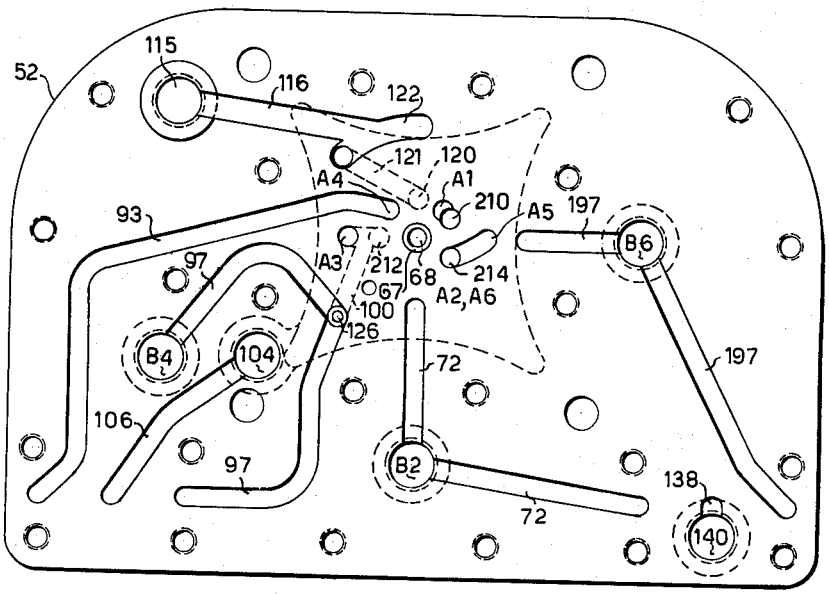
Figure 16:
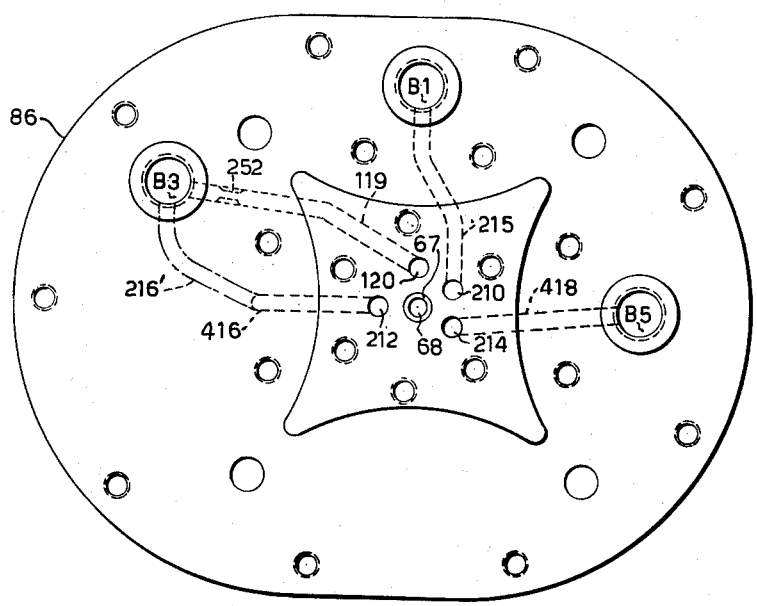
Figure 18:
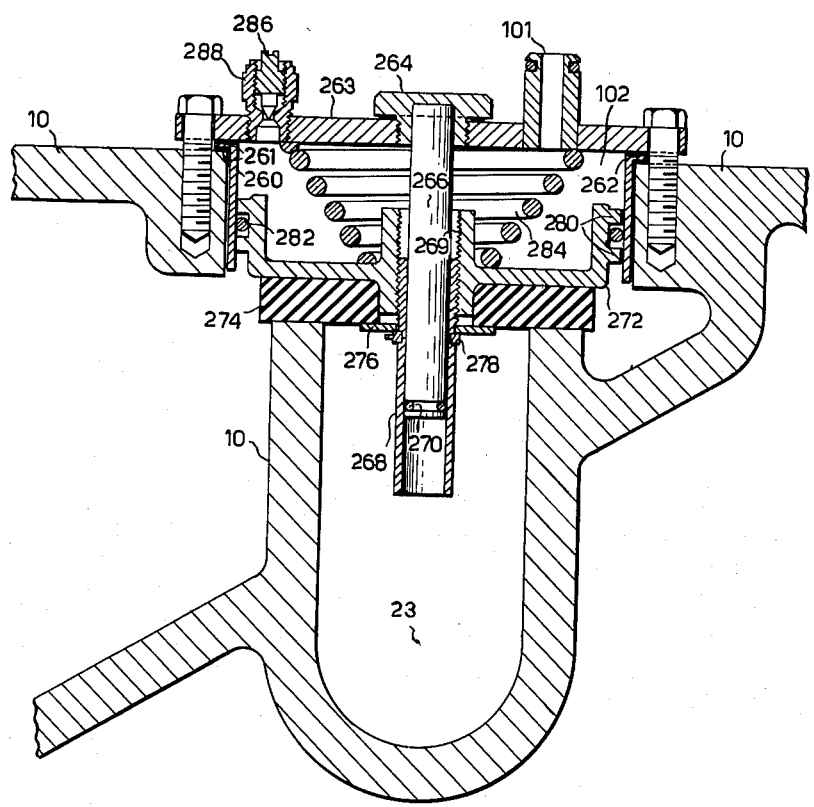
Figure 19:
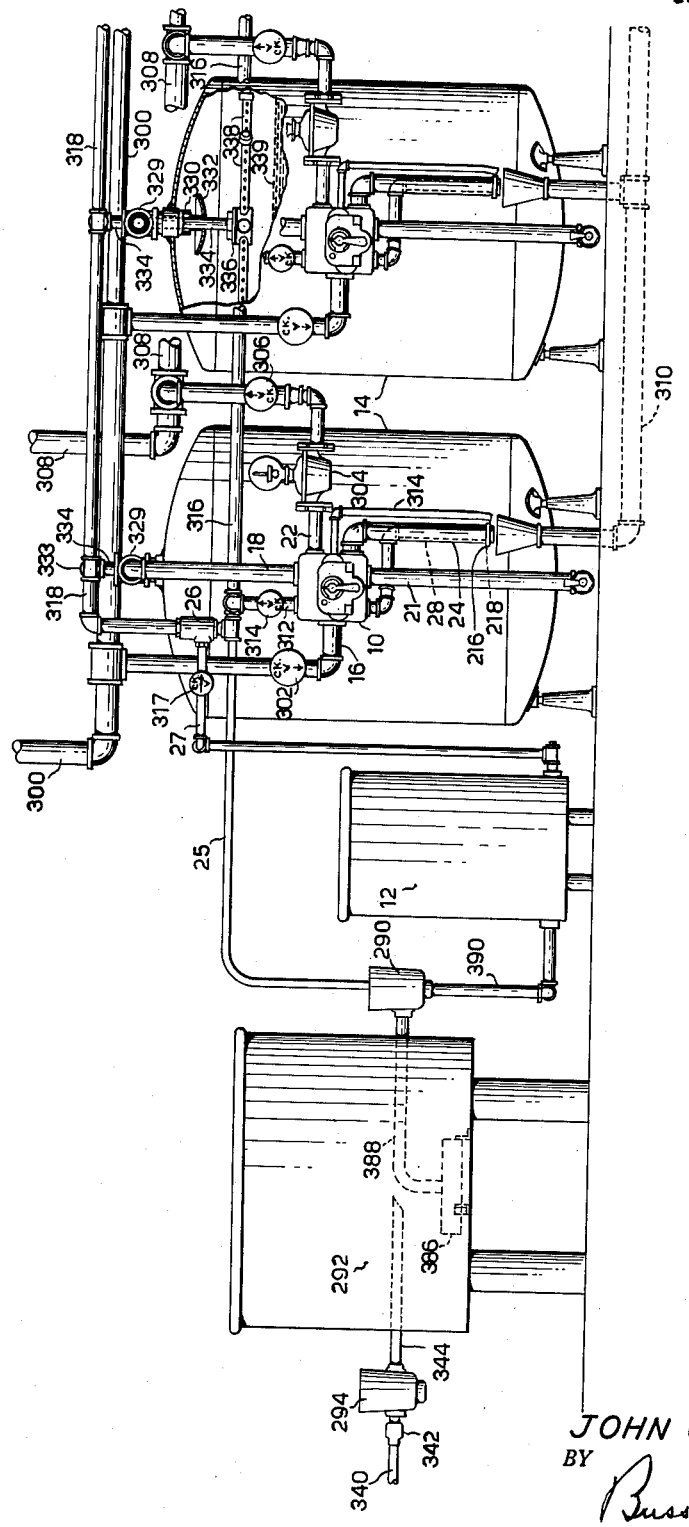
Figures 20, 21:
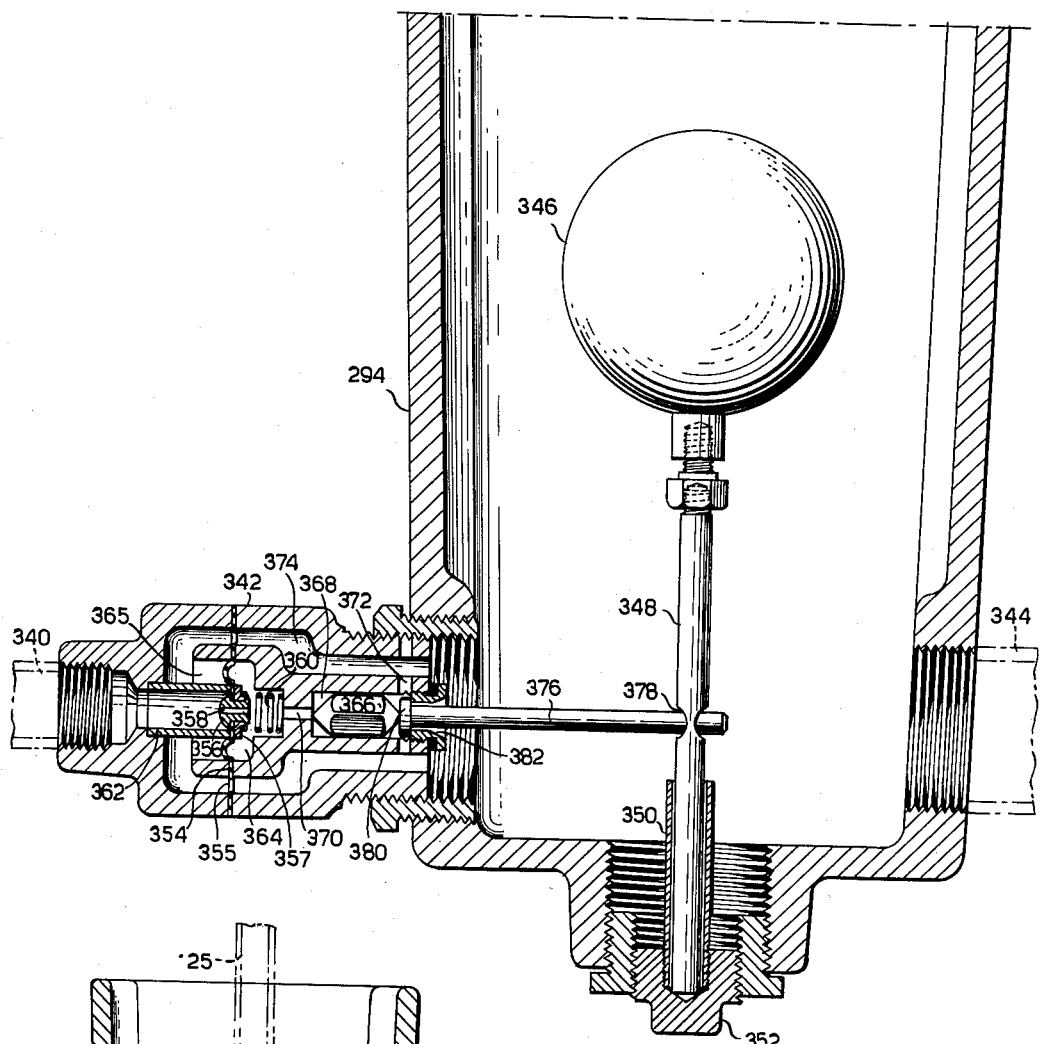

Figures 7 to 13, inclusive, are schematic representations of the various positions of the pilot control valve;

Figure 14 is a vertical section of the valve assembly taken on the surface indicated by 14—14 in Figure 4 showing the internal structure of the valve body;

Figure 15 is an elevation of the front distributor plate showing the various ports and passages contained therein;

Figure 16 is an elevation of the back distributor plate showing the various ports and passages contained therein;

Figure 17 is an enlarged fragmentary section showing a typical bellows valve bellows and face structure;

Figure 18 is an enlarged fragmentary section of the valve assembly showing a piston type valve substituted for the bellows valve;

Figure 19 is a front elevation of an entire liquid treatment plant including regenerant supply tanks, liquid treatment tanks and flow control valves;

Figure 20 is a vertical section of an element of the invention shown in Figure 19; and Figure 21 is a vertical section of another element of the invention shown in Figure 19.

Figure 1:
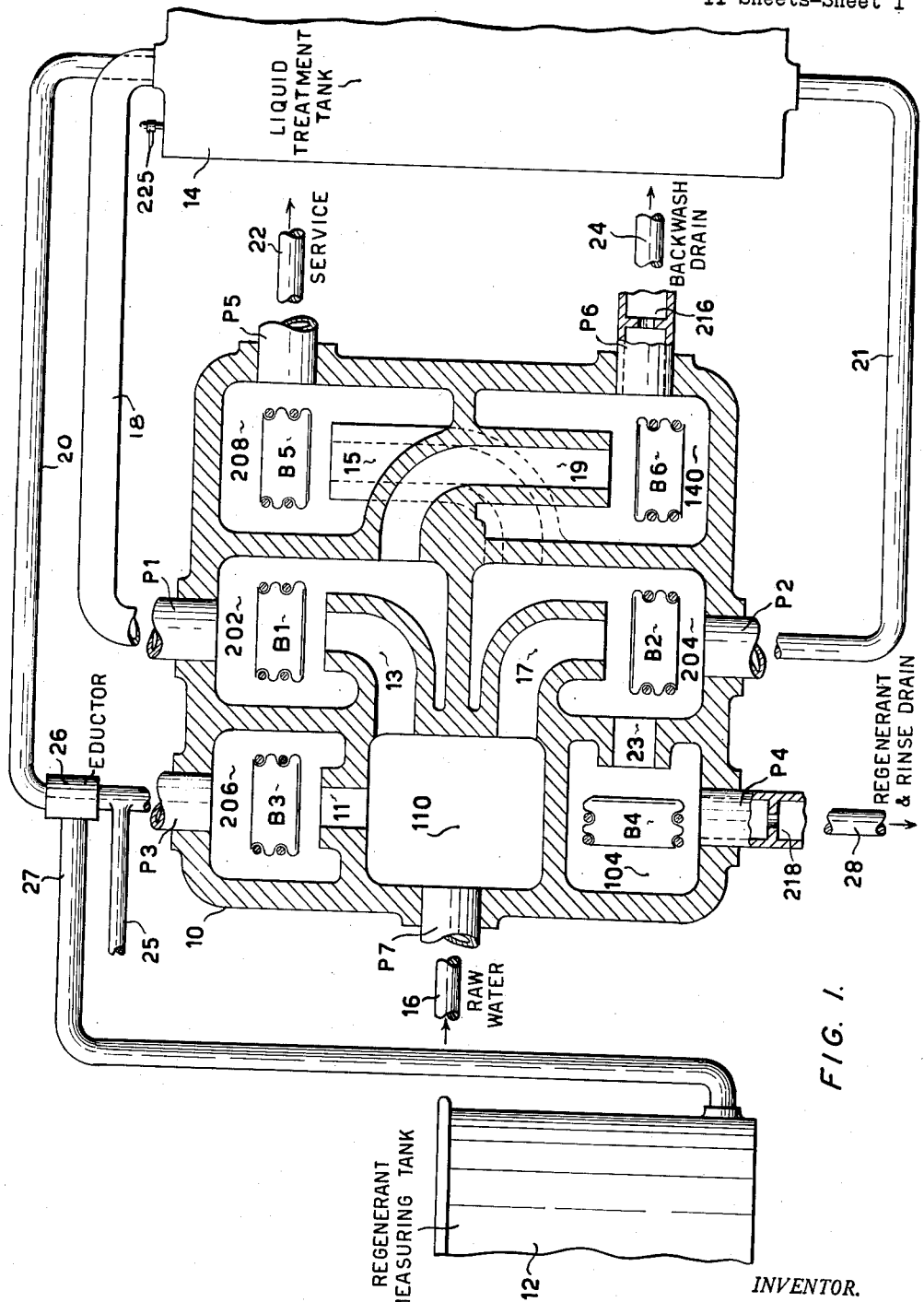
Figure 1 is a general diagrammatic layout of a liquid handling system including a treatment tank, a regenerant tank and the improved bellows valve assembly.

The liquid treatment system, as shown in Figure 1, employing the present control valve includes the valve body 10, a regenerant tank 12 containing the regenerant solution, a treatment tank 14 containing the ion exchange, filtration, or other liquid material, a raw water supply pipe 16, a service pipe 22, and waste or drain line connections 24 and 28 containing orifices 216 and 218, as will be hereinafter more fully described. The function of the pipe line 25 will be described in a later portion of this disclosure. For convenience, the discussion of the sequence of operations which follows will refer to an ion exchange system although it could equally well apply to other treating systems, and at this time no mention will be made of the pilot control of the bellows valves, the purpose of this discussion being to present the valve body structure and bellows valve operation as they serve to control the various sequences of operations as follows:

For service, the raw water supply 16 is admitted into chamber 110 in the valve casing through port P7. Bellows valve B1 is in open position allowing the supply water to pass through passage 13, chamber 202, and port P1, through pipe 18 to the top of treatment tank 14, through the treatment tank leaving the bottom of the tank through pipe 21, entering the valve body through the port P2, passing through the body of the valve through chamber 204 and passage 15, and past open bellows valve B5 into chamber 208, emerging through port P5 and passing to service through pipe line 22. During the service operation bellows valves B1 and B5 are open and the other four valves are in a closed position.

After the ion exchange capacity of the treatment material is exhausted, it is necessary to restore this capacity by backwashing, regenerating, and rinsing the treatment bed.

The sequence of flow for backwash is as follows: Raw water is admitted to the valve from raw water supply 16 through port P7, into chamber 110, and passes through passage 17 and past open bellows valve B2 into chamber 204 and out through port P2 and pipe 21 to the bottom side of treatment tank 14. The reverse flush passes out of the top of the treatment tank through pipe lines 20 and 18 into the valve body chamber 202 through port P1, through passage 19, past open bellows valve B6 to chamber 140 and to drain through port P6 and orifice 216 to drain pipe 24. In this operation, bellows valves B2 and B6 are open and the four other valves are in closed position.

The next step in the sequence is regeneration in which raw water is admitted through supply pipe 16 and port P7 into chamber 110 and passes through passage 11, past open bellows valve B3 into chamber 206 and out through valve port P3 and eductor 26, thereby drawing regenerant solution from regenerant tank 12 through pipe line 27. The regenerant solution then passes through pipe line 20 to the treatment tank and returns through pipe line 21, into port P2, into chamber 204, through passage 23, past open bellows valve B4 into chamber 104 and emerges through port P4 and orifice 218 to drain line 28. During regeneration bellows valves B3 and B4 are open and the four other valves are in closed position.

Following the completion of the regeneration cycle, it is necessary to rinse the residual regenerant solution from the treatment tank. During the rinsing sequence, raw water from supply line 16 is admitted through port P7, passes into chamber 110, through passage 13, open bellows valve B1, chamber 202, port P1 and pipe line 18 to the treatment tank. Emerging from the bottom of the treatment tank, the water passes through pipe line 21, enters the valve chamber 204 through port P2, passes through passage 23 and open bellows valve B4 into chamber 104 and flows to drain through port P4, orifice 218 and pipe line 28. During the rinse operation, bellows valves B1 and B4 are open and the four other valves are closed.

For each of the steps of backwashing, regenerating and rinsing as are required in the reconditioning of the treatment material, it is important to control the rate of flow through the bed. The principles of operation of this flow rate regulation are shown in Figure 2 in which is drawn schematically a section of the control valve employing a flow rate controller. The actual structure employed will be hereinafter described in detail. This schematic representation is typical for the backwash flow, the regenerant flow and the rinsing flow rate controllers. It should be borne in mind, however, that the backwash flow is maintained at a considerably greater rate than that of either the rinse or the regenerant flow. The average backwash rate is maintained at approximately double the average rinse rate and the average rinse rate is approximately double the average regeneration rate.

Referring to Figure 2 water at line pressure enters the orifice 41 regardless of the position of the hereinafter described pilot valve. When the bellows valve 30 is to be in closed position the line 42, which is connected to the pilot valve, is also receiving liquid under line pressure from the pilot valve. Thus line pressure is maintained in the pipe lines 43 and 38 and in the bellows valve chamber 31. The bellows valve 30 is, therefore, held firmly in a closed position against the rim 34 of passage 32 because of the difference in surface areas of the valve face 33 acted upon by the equal (raw water supply) pressures in chambers 31 and 32. When it is desired to open the bellows valve, the position of the pilot valve is changed and the pressure of the fluid in pipe line 42 is reduced to zero. The fluid to connection 30 is supplied through the fixed orifice 41 of limited size in line 40 and the pressure in the connection 38 will vary depending upon the operation or bleed rate of the pressure regulator indicated generally at 44.

As will be obvious from Figure 2, as the bellows valve 30 opens the liquid from passage 32 will flow past valve face 33 into chamber 49 and will pass out of the valve body chamber 34 through drain orifice 35 to drain. The pressure regulator includes an orifice 46 joined to connection 38 through connection 43 the effective opening of which orifice is regulated by the position of diaphragm 48. Diaphragm 48 is made of heavy rubber or rubberized fabric having a spring action normally causing it to open the orifice 46. As the pressure in chamber 49 increases with flow rate through orifice 35, an increase in pressure is applied against the face of diaphragm 48 as indicated generally at 50, thereby deflecting the diaphragm and reducing the effective opening of orifice 46, increasing the resistance to flow of control liquid from pressure pipe line 40 through the effective opening of orifice 46 to chamber 47 through line 42 which is now connected to drain. This increase in resistance of flow to drain results in an increase of the pressure in pipe line 38, thus increasing the pressure in bellows valve chamber 31 and restricting the flow from passage 32 past the face 33 of the bellows valve. This restriction in flow is immediately followed by a reduction in pressure in chamber 49 and a subsequent increase in the effective opening of orifice 46. Thus the bleed rate through orifice 46 controlling the pressure of the fluid within the valve chamber 31 will vary with the pressure in chamber 49.

In other words, the rate control system operates to maintain a constant pressure in chamber 49, thus maintaining a constant rate of flow through orifice 35 regardless of fluctuations in the supply water pressure. The diaphragm and orifice combination being highly responsive to small changes in pressure within chamber 49 effect a prompt control over the bellows valve, thus translating these pressure changes due to slight increases or decreases in the flow rate past the bellows valve into changes in position of the bellows valve providing an accurate control of the pressure within chamber 49 and hence of the rate of flow.

It should be noted that the bellows valve is in a closed position prior to its operation which permits a flow to drain and, in allowing and controlling this flow, the valve starts from a closed position. As a result of the limited maximum flow of control liquid through orifice 46, the bellows valve cannot open excessively before sufficient pressure exists in chamber 49 to provide controlling action by the diaphragm 48 and the orifice 46 upon the bellows valve operation. Thus the discharge rate can never exceed, even transiently, except to a minor degree, the flow rate desired, thereby preventing disarrangement of the filter bed or the loss of any treatment material from the treatment tank during backwash.

While the present flow control system is in reality a pressure control system within the apparatus controlling the liquid pressure in a chamber ahead of an orifice which pressure is in turn controlled by regulating the flow past a bellows valve by controlling the operating pressure in the bellows valve, for convenience the apparatus and elements thereof will be referred to objectively as flow rate control apparatus.

It is an important feature of this element of the invention that proper backwash, rinse and regenerant flow rates are automatically obtained and retained in the manner described regardless of fluctuations in raw water supply pressure.

While the functional relations of the various ports and chambers of the valve can possibly be more conveniently followed by reference to the schematic showing of the valve body in Figure 1, the structure of the valve body can be more readily understood by reference to Figures 3 to 6 and 14 to 16.

The valve assembly comprises a valve body casting

10. Mounted on the front of this casting is a distributor plate 52, a gasket 51, a distributor plate cover 53, and pilot valve member 56 urged against the pilot valve disc 54 by the action of the spring washer 57 acting between the pilot valve 56 and the flange 58 of the pilot valve shaft 61. The flange 58 bears against the bearing member 59 which in turn bears against the pilot valve cover 62. The position of the pilot valve 56 is controlled by the pilot valve shaft 61 and the pilot valve control lever 60. The pilot valve member 56 is made of a stainless steel or other suitable wear and corrosion-resistant material, and the pilot valve disc 54 is made from sintered carbon or other suitable material preferably having noncorrosive and self-lubricating properties. The pilot valve cover 62 serves to enclose the pilot valve assembly and forms a chamber 64 wherein raw water is fed as a source of bellows valve control pressure. As control lever 60 is rotated to assume predetermined positions, as located by numbers 1, 2, 3 and 4 on the outside of the pilot valve cover, the pilot valve 56 is rotated with respect to pilot valve disc 54, thereby connecting the various passages in disc 54 and distributor plate 52 with either the fluid in pressure chamber 64 or to the drain through central bore 68 as determined by the position of passages 124 and 130 within the pilot valve 56 as shown in Figure 7.

Figure 6:
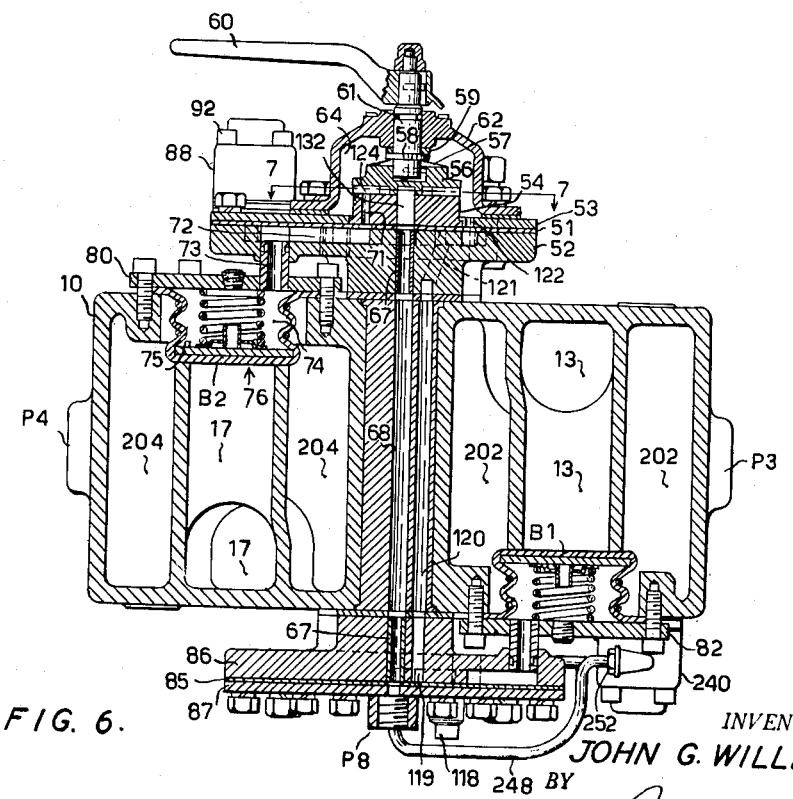
Figure 6 is a vertical section of the valve assembly taken on the plane indicated by 6—6 in Figure 3.

Typical of one of these positions is that shown in Figure 6 wherein the fluid under pressure in chamber 64 is admitted to passages 124 in the pilot valve, 71 in the pilot valve disc, 72 in the distributor plate, and through connecting fitting 73 to the valve body and into chamber 74 of bellows valve B2. The line water pressure applied to the upper side 75 of bellows valve B2 is applied over an area greater than the pressure applied on the underside of the bellows valve as indicated generally at 76 within the passage 17. Under this condition, the valve must remain firmly closed and the bellows valve B2 cannot open until, by changing the position of the pilot valve, the fluid pressure in bellows valve chamber 74 is reduced to zero by the connection thereof through passage 132 to drain line 68.

Figure 3:
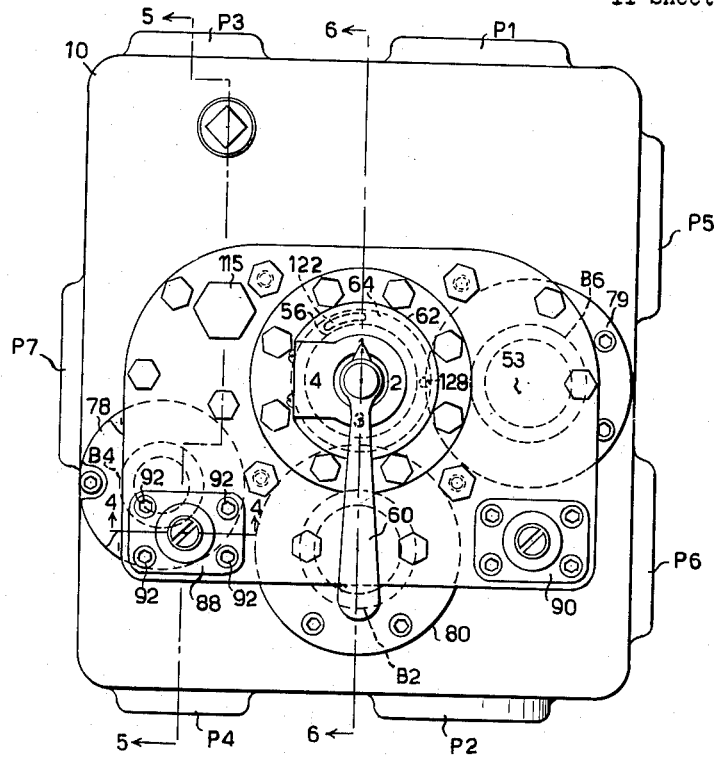
Figure 3 is a front elevation of the valve assembly.

As is shown in Figure 3, the cover plate 78 enclosing the bellows valve B4, the cover plate 79 enclosing a bellows valve B6 and the cover plate 80 enclosing bellows valve B2 are all on the front of the valve body 10. The other three bellows valves B1, B3 and B5 are on the back of the valve body. The cover plate 82 for valve B1 is shown in section in Figure 6 and cover plates 84 and 83 for valves B3 and B5 are shown in Figure 4. Each of the bellows valves B1, B3 and B5, operating on the back of the valve body, receives control liquid flowing from the pilot valve through passages 210, 212, 214, respectively, bored in the front distributor plate 52 and through the center of the valve body to the back distributor plate, connecting with passages 215, 416 and 418, respectively, in the back distributor plate and leading to the valve chamber of the valves B1, B3 and B5, respectively.

Mounted on the front distributor plate are two flow rate controllers. The flow rate controller within housing 88 serves to control the rinse flow rate through the bellows valve B4 and the rate controller in housing 90 serves to control the backwash flow rate through valve B6. Mounted on the back of the valve body in the housing 240 is the regenerate flow rate controller which serves to control the flow rate through the bellows valve B3. The three flow rate controllers are similar, and therefore, a discussion of the structure of one will serve for all. The principle of operation of the pressure controlling elements of the rate controllers has been presented in the discussion referring to the diagrammatic Figure 2.

The rinse flow rate controller shown in section in Figure 4 includes a housing 88, bolted to the front distributor cover plate 53 by four bolts 92. Clamped between the housing 88 and the front distributor cover plate is a diaphragm 94 corresponding to diaphragm 48 of Figure 2. Screwed into the housing is an orifice member 96. The chamber 98 connects, by means of port 91 in the regulator housing and passage 93 in the distributor plate, to a port (A4) in the pilot valve assembly. The passage 99 of the orifice member 96 connects through port 95 in the regulator housing and passage 97 in the front distributor plate through connecting port 101 to the inside chamber 102 of bellows valve B4. The passage 97 is also connected through the orifice passage 126 and the passage 100 to a port (A3) in the pilot valve assembly. Fluid pressure from the valve body chamber 104 of the valve B4 is transmitted through connecting fitting 107 to passage 106 in the front distributor plate and port 108 in the cover plate to the underside of the flow rate control diaphragm 94. The flow of liquid through the center passage 99 of the orifice member 96 is limited by the deflection of the diaphragm resulting from the pressure applied to the underside thereof from chamber 104 through connecting fitting 107 and passage 106.

It should be noted that the fluid pressure in chamber 104 may be established for any desired rate of flow to drain by the application of an orifice in the drain line such as is shown at 218 and 216 for valves B4 and B6, respectively, in Figure 1 and as shown schematically in Figure 2 at 35. These orifices are not part of the valve body proper and therefore do not appear in the figures showing the valve body structure. This structure is adapted, however, only as a matter of convenience. The orifices could be built as a part of the ports (P4 and P6) in the valve body and be perfectly operative.

As hereinbefore described, the orifice and diaphragm combination serves to control the pressure in chamber 104 by virtue of the control it exercises on the pressure within bellows valve chamber 102 which, in turn, determines the flow past bellows valve B4 and the flow rate to drain through orifice 218 which is dependent upon the pressure in chamber 104. By adjusting the position of the screw plug 96, the spacing between the end of orifice passage 99 and the diaphragm 94 can be varied. Thus it is a simple matter to adjust the pressure maintained in chamber 104 and thereby adjust the rate of flow to drain.

The backwash flow rate regulator is contained within the housing 90 and is connected to the bellows valve B6 through passage 197 in the front distributor plate and the connecting fitting 199. Passage 197 is also connected through orifice 128 in the distributor cover plate 53 to pressure within chamber 64 of the pilot valve assembly. The backwash flow rate regulator is also connected to the valve body chamber 140 through the passage 138 in the distributor plate and connecting fitting 141, and to a port (A6) in the pilot valve assembly through passage 72 in the front distributor plate.

The regenerate flow rate regulator is contained within the housing 240 and is connected to the bellows valve B3 through the tubing 242 and the bore 244 in the valve cover plate 84. It is also connected to the valve body chamber 206 through bore 246 in the valve body, and to a port (A3) in the pilot valve assembly through tubing 248, the passage 416 in the rear distributor plate, and passages 212 in the rear distributor plate, 212 in the valve body, and 212 and 100 in the front distributor plate. The valve B3 is connected to pressure through connecting fitting 250, orifice 252, passage 119 and passage 120 which connects with passage 121 in the front distributor plate and the pilot valve pressure chamber 64.

It should be noted that only two ports, P6 and P4, are provided through which liquid may be delivered to drain and these ports are designed to suit the average rates of flow during the backwash and rinse operations. The flow rate during regeneration is sufficiently low so that the regenerant waste may be delivered to drain through the rinse drain port.

The front and rear distributor plates are shown in elevation in Figs. 15 and 16. The bores marked B1, B2, etc., connect through connecting fitting to the chambers of the bellows valves bearing these designations.

The various passages are formed in the surfaces of the plates and are closed by the gaskets 51 and 85, and cover plates 53 and 87, as shown in Fig. 4. It will be noted that the bores 68, 120, 210, 212 and 214 in the front and rear distributor plates are joined by similarly identified bores through the center of the valve body, as shown in Figs. 14, 15 and 16.

Referring to Figures 3, 4 and 6, as hereinbefore explained, the pilot valve is mounted on a front distributor plate 52 and includes a stationary pilot valve disc 54, a rotatable pilot valve 56, a shaft 61 pinned to the pilot valve, pilot valve control lever 60 pinned to the pilot valve shaft, and pilot valve housing 62. The various positions of the pilot valve control lever are indicated by the numbers 1, 2, 3 and 4 on the pilot valve housing. For the various pilot valve positions, ports in the pilot valve and the pilot valve disc assume such relationships as will serve to connect the various bellows valves through passages in the distributor plates to a pressure source or to drain and thereby control their operation.

More specifically, raw water supply is admitted to the valve body through port P7 and enters chamber 110, passes through port 112, connecting fitting 113 and screen 114 mounted within filter cap 115. Filter cap 115 is screwed into the front distributor plate cover 53 and thus can be conveniently removed for cleaning. The supply water after passing through screen 114 enters passage 116 in the distributor plate and passes through passages 122 in the distributor plate and the cover plate to pilot valve pressure chamber 64.

In the event that it is undesirable to use the raw water supply for bellows control, for example because it is corrosive, a separate supply may be admitted through the opening in the rear distributor cover plate 87 as shown, plugged by plug 118, in Figure 6. This opening connects with the passage 119 in the rear distributor plate and bores 120 through the distributor plates and the valve body connecting with passage 121 in the front distributor plate and 122 in the front distributor plate cover and feeding into pilot valve pressure chamber 64.

Referring now to Figures 7 to 13, inclusive, these figures show schematically the various positions of the pilot valve and the control effected thereby. The figures are generally representative of a section taken through plane 7—7 in Figure 6 and the construction line passages are representative of the passages in the front distributor plate leading to and from the flow rate control valves, bellows valves and valve body chambers. The following tabulation presents the bellows valve positions as required for the various service operations and corresponding to various positions of the pilot valve control lever:

|              | B1 | B2 | B3 | B4 | B5 | B6 | Fig. |
|---|---|---|---|---|---|---|---|
| 1 Service    | O  | C  | C  | C  | O  | C  | 7    |
| 2 Backwash   | C  | O  | C  | C  | C  | O  | 8    |
| 2 Regenerate | C  | O  | O  | O  | C  | C  | 9    |
| 4 Rinse      | O  | C  | O  | O  | O  | C  | 10   |
| 1-2 Off      | C  | C  | C  | C  | C  | C  | 11   |
| 3-4 Tank Drain | C | C | C  | C  | C  | C  | 12   |
| 4-1 Standby  | O  | C  | C  | C  | O  | C  | 13   |

Figure 7 illustrates the pilot valve condition when the pilot valve control lever is set in the No. 1-Service position. Between pilot valve housing 62 and the pilot valve 56, there exists chamber 64 containing supply water under pressure. This supply water enters passage 124 in the pilot valve 56 whence it is admitted to the apertures A3, A4 and A2,6 in the pilot valve disc 54. The aperture labelled A3 connects through the top distributor plate, central bore 212 in the valve body, passage 416 in the rear distributor plate, tubing 248, the regenerate flow rate controller 240, and tubing 242 to the bellows valve B3. Pressure is also being supplied to the valve B3 through connecting fitting 250 and orifice 252 from the passage 119. Therefore, full pressure exists in the valve B3 and it is maintained in a closed position. Aperture A4 is connected through passage 93 in the front distributor plate, the rinse flow rate controller 88, the passage 97 and connecting fitting 101 to the bellows valve B4. Pressure is also being supplied to passage 97 and valve B4 through the orifice 126 from the passage 100 which is connected to port A3. Therefore, full pressure exists in the valve B4 and it is maintained in a closed position. Aperture A2,6 (shown as 71 in Figure 6) is connected directly to the bellows valve B2 through the passages 72 and 73 thereby applying pressure within the valve B2 and maintaining the valve in a closed position. Valve B6 is receiving pressure through the passage 197 from passage 72 through the backwash rate controller 90 and also from orifice 128 which is drilled in the front distributor cover plate and opens into pressure chamber 64. Therefore, full pressure exists in the valve B6 and it is maintained in a closed position.

Also contained within the pilot valve is passage 130. In the No. 1-Service position of the pilot valve, passage 130 connects apertures A1 and A5 which are connected to bellows valves B1 and B5, respectively, to passage 132 which, as shown in Figure 6, continues through passage 67 in the front distributor plate through passage 68 in the valve body casting through the rear distributor plate and is connected to drain at port P8. Under this condition, bellows valves B1 and B5 contain no pressure within the bellows. Therefore, the fluid pressure operating against the face of these bellows in the valve body forces them to an open position allowing a passage of water through these valves for service flow as previously described.

Figure 8 illustrates the pilot valve condition when the pilot valve lever is set in the No. 2-Backwash position. In this position of the pilot valve apertures A3, A4, A1, and A5 of the passages to bellows valves B3, B4, B1 and B5 are all connected with the pressure source through passage 124 in the pilot valve; therefore, these bellows valves are under pressure and are held in a closed position. In this pilot valve position, the passage 130 in the pilot valve connects aperture A2,6 to the central drain passage 132, thus draining the pressure from the bellows valve B2 and allowing valve B2 to open. During the backwash operation, however, it is desirable to control the rate of backwash flow past bellows valve B6 to drain. This backwash flow rate control prevents excessive flow or surges from carrying treating material out of the treatment tank and also, due to the fact that a uniform flow rate is maintained regardless of supply pressure variations, allows the use of a fixed backwash time which will always provide uniform backwash effectiveness. This control, as has been hereinbefore reviewed, is maintained by virtue of the fact that passage 197 is constantly receiving pressure through fixed orifice 128 and the pressure level maintained in passage 197 and applied within bellows valve B6 is determined by the pressure drop through orifice 128 which varies with the bleed rate through rate controller 90 the exterior chamber of which has now been connected to drain through passages 72, 130 and 132. The bleed rate through rate controller 90 is determined by the effective controller orifice area which is, in turn, determined by the pressure against the rate controller diaphragm received from passage 138 which connects with the backwash exit chamber 140 in the valve body. This operation is the same as that described in connection with the rate controller schematically shown in Figure 2.

Figure 9 illustrates the pilot valve condition when the pilot valve control lever is set in the No. 3-Regenerate position. In this position, apertures A1, A5 and A2,6 are all connected to pressure through passage 124 in the pilot valve and the respective bellows valves B1, B5 and B2,6 are, therefore, closed. Apertures A3 and A4 are connected through the passage 130 in the pilot valve to drain passage 132. During the regenerate operation it is desirable to control the rate of regenerate flow past the bellows valve B3 to the eductor. During this portion of the cycle regenerant solution is drawn from the regenerant tank 12 through pipe line 27 by the action of eductor 26. In order that the solution thus supplied to the softener tank will be of constant concentration and provide uniformity of treatment, it is essential that the water treatment equipment include a flow rate control such as is herein provided for the regenerating operation which will provide a uniform flow rate independent of fluctuation in pressure of the water supply. This control is maintained by virtue of the fact that passage 242 is constantly receiving pressure through fixed orifice 252 from passage 119, and the pressure level maintained in the passage 242 and applied within the bellows valve B3 is determined by the pressure drop through orifice 252 which varies with the bleed rate through the rate controller 240, the exterior chamber of which has now been connected to drain through passages 248, 416, 212, 100, 130 and 132. The bleed rate through the rate controller 240 is determined by the effective controller orifice area which is, in turn, controlled by the pressure against the rate control diaphragm received from passage 246 which connects with the chamber 206 in the valve body. Aperture A4 connects through passage 93 in the front distributor plate to rate controller 88. On the other side of the rate controller 88 passage 97 is connected to bellows valve B4. Aperture A3 is also connected to passage 97 through the passage 100 and fixed orifice 126. Thus in this position there is no pressure applied within the bellows valve B4. Therefore, the valve B4 will be opened by the pressure of the liquid flowing through passage 23 into chamber 104 and to drain.

Figure 10:
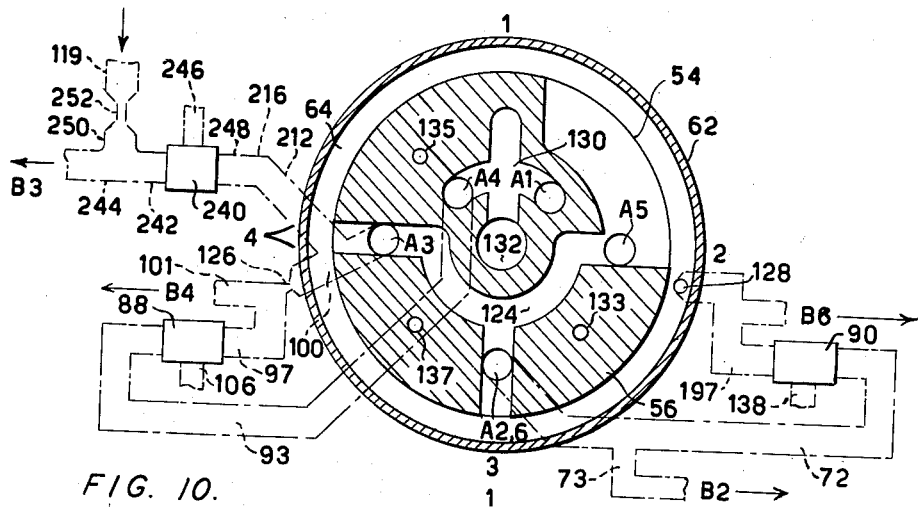

Figure 10 illustrates the pilot valve condition when the pilot valve control lever is set in the No. 4-Rinse position. In this position, apertures A3, A5 and A2,6 are all connected to pressure through passage 124 in the pilot valve and the respective bellows valves are, therefore, closed. Apertures A1 and A4 are connected through passage 130 in the pilot valve to drain passage 132. Inasmuch as aperture A1 connects directly to bellows valve B1, the valve B1 is allowed to open. During the rinse operation it is desirable to control the rate of rinse flow past the bellows valve B4. This control is maintained by virtue of the fact that the passage 97 is constantly receiving pressure through fixed orifice 126 and the pressure level maintained in passage 97 and applied within the bellows valve B4 is determined by the pressure drop through orifice 126 which varies with the bleed rate through rate controller 88, the exterior chamber of which has now been connected to drain through passages 93, 130 and 132. The bleed rate through the rate controller 88 is determined by the effective controller orifice area which is, in turn, determined by the pressure against the rate controller diaphragm received from passage 106 which connects with the rinse exit chamber 104 in the valve body.

Rate control during rinsing allows the use of a fixed rinsing time and assures a uniformity of treatment and, therefore, is highly desirable. Rinsing of the bed is required to remove the excess of the regenerant chemical in preparation for normal service. To complete regeneration in a reasonable length of time it is usually necessary that two to four times the theoretical quantity of regenerant chemical be used and, as a result, the bed is saturated with raw regenerant chemical at the end of the regeneration period. Since raw untreated water is normally used to rinse the bed, the quantity of the rinse water should be limited to only that quantity which will remove the excess regenerant chemical. Excessive quantities of rinse water will reduce the ionic change capacity of the bed material.

Figure 11:
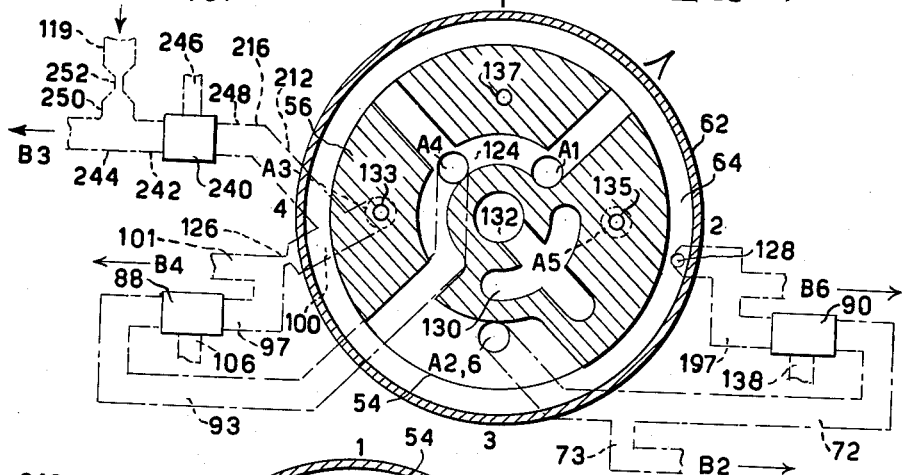

Figure 11 illustrates the pilot valve condition when the pilot valve control lever is set in the No. 1-2-Off position, i. e., midway between the 1 and 2 positions. In this position, the apertures A1, A4 and A2,6 are all connected to pressure through passage 124 in the pilot valve and the respective bellows valves B1, B4 and B2,6 are, therefore, closed. In this position of the pilot valve, apertures A3 and A5 are connected to pressure through ports 133 and 135, respectively, in the pilot valve and the bellows valves B3 and B5 are also closed. Thus, in an emergency, all the bellows valves can be quickly closed, terminating all flow through the control valve assembly.

Figure 12:
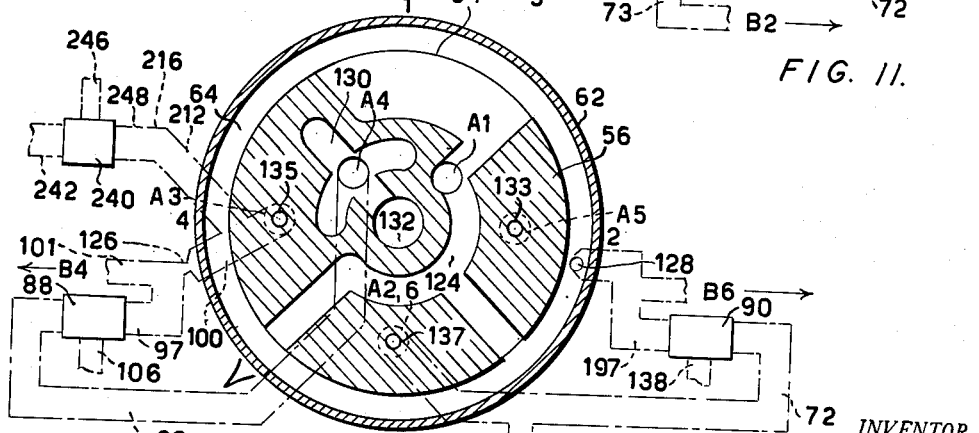

Figure 12 illustrates the pilot valve condition when the pilot valve control lever is set to the 3-4 Tank Drain position. In this position, aperture A1 is connected to pressure through passage 124 in the pilot valve and bellows valve B1 is held in a closed position. Apertures A2,6, A3 and A5 are connected to pressure through ports 137, 135 and 133, respectively, therefore, the bellows valves B2, B6, B3 and B5 are each held in a closed position. Aperture A4 is connected to drain. Thus bellows valve B4 will be open, allowing the treatment tank to drain while all of the other bellows valves are held in a closed position, preventing any other liquid flow in the system. A manually operated cock 225 is installed in the top of the treatment tank which can be opened to provide an inlet for air during the draining operation. It may be noted that since only a low flow rate under the action of gravity is now involved, the rate controller is, in effect, inoperative.

Figure 13 illustrates the pilot valve condition when the pilot valve control lever is set to the 4-1 Standby position. In this position, apertures A4 and A5 are connected to pressure through passage 124 in the pilot valve and the respective bellows valves B4 and B5 are, therefore, in closed position. Apertures A3 and A2,6 are connected to pressure through ports 137 and 133, respectively, therefore, the bellows valves B3, B2 and B6 will be held in a closed position. Thus in the 4-1 position, only aperture A1 is connected to drain and only bellows valve B1 is in open position. Therefore, the treatment tank is maintained full and under pressure ready for service when required.

The No. 2-3 valve position is not diagrammed, but it should be noted that in this position all the apertures are connected to pressure, thus, all the valves will be closed as they were in the No. 1-2 position. It should also be noted that when moving the pilot valve from any position in either direction to any other position the bellows valves, which were open and are to be closed in the other position, will be closed after the valve has rotated 45° and the bellows valves which were closed and are to be open in the other position will be opened only after the valve has rotated 90°. Thus, there can never be undesirable valve operations between pilot valve positions.

The regenerant rate controller may be omitted under conditions of sufficiently uniform supply water pressure in which case the bellows valve B3 would be supplied by control liquid directly from the pilot valve port A3 through passages 112, 116 and an extension of passage 116 shown in construction lines in Figure 16 as 116'. The orifice 252 would be made to completely seal off the passage 119.

While the previous discussion has been directed primarily to the application of the valve assembly in iron exchange equipment, it is obvious that the valve may be employed in filtration or other types of liquid treating apparatus. In ordinary filtration equipment not requiring a chemical regenerant solution the regenerating operations generally include the steps of agitating the surface of the filter bed and reverse flushing the filter bed to wash out the foreign matter which has been loosened by the agitation. The agitation is generally accomplished by passing liquid through a series of nozzles affixed to a pipe which is rotated over the surface of the filter bed with the jets of liquid emerging from the nozzles impinging on the surface of the bed causing agitation thereof.

The present valve may be employed in such a system by connecting the output of port P3, which is now connected to the eductor, to the surface agitator and by reversing the sequence of valve operations. This reversed sequence is as follows: the No. 1 position is the service position as before, the No. 2 position (No. 4 above) is not used, the control pilot merely passing over this position in changing from the No. 1 position to the No. 3 position. While the valve is passing over the No. 2 position, however, there will be a downward flush through the treatment tank of momentary duration, the maximum flow rate which is controlled by the rinse flow rate controller will slightly exceed the rate of flow during agitation. The No. 3 position which was formerly the brining position is now the agitation position during which liquid is passed to the surface agitation jets. The rinse flow rate controller is set to allow sufficient flow through the agitation jets to produce the desired agitation. The No. 4 position (formerly the No. 2 position) provides the reverse flush for carrying off the foreign materials which have been loosened from the surface of the filter bed by the agitation operation. The last successive position is, of course, the No. 1 service position.

It should be particularly noted that the only moving parts in this valve are the pilot valve, the valve bellows and the rate control diaphragms.

The pilot valve is supplied with liquid through a strainer and, if the normal liquid supply is unsuited for use in the pilot valve control, provision has been made whereby a separate liquid supply can be directed to the pilot valve assembly. Thus protected and assured of a clean and suitable supply of liquid, the pilot valve will give long and satisfactory service.

A particularly important phase of the invention is the bellows valve. This type of valve is practically frictionless in its operation. The long operating stroke of this valve provides a large opening, thus offering a relatively small restriction to flow through a valve of relatively small diameter. Unlike the diaphragm type of valve where the valve motion is restricted and the valve material must buckle or compress in passing from a domed position on the other side of the plane of the valve, the material in the bellows valve undergoes only a gentle flexing while the valve itself travels a much greater distance.

The bellows valve is preferably constructed with the bellows portion as shown at 30 in Figure 17 consisting of a laminated fabric covered with a rubber selected to obtain high tensile strength, whereas the face of the valve 33 is covered with a rubber selected to conform with irregularities by virtue of high resilience and to retain low permanent set. The rings 230 are provided to restrain the bellows wall preserving the accordion-like shape of the bellows during valve operation. Member 231 is a backing plate for the rubber face 33 of the valve. Attached to this plate is the cylindrical member 232 which serves to locate spring retainer cup 233 on which is mounted spring 234. The spring 234 serves to hold the valve in a closed position when no pressures exist either within the bellows valve or in the valve body chambers. When the valve is in the open position, the member 232 serves the additional purpose of limiting the valve stroke by contacting the valve cover and thereby preventing any possibility of the bellows valve wall 30 being pinched or crushed between the rings 230, the backing plate 231 and the valve cover plate.

Figure 5:
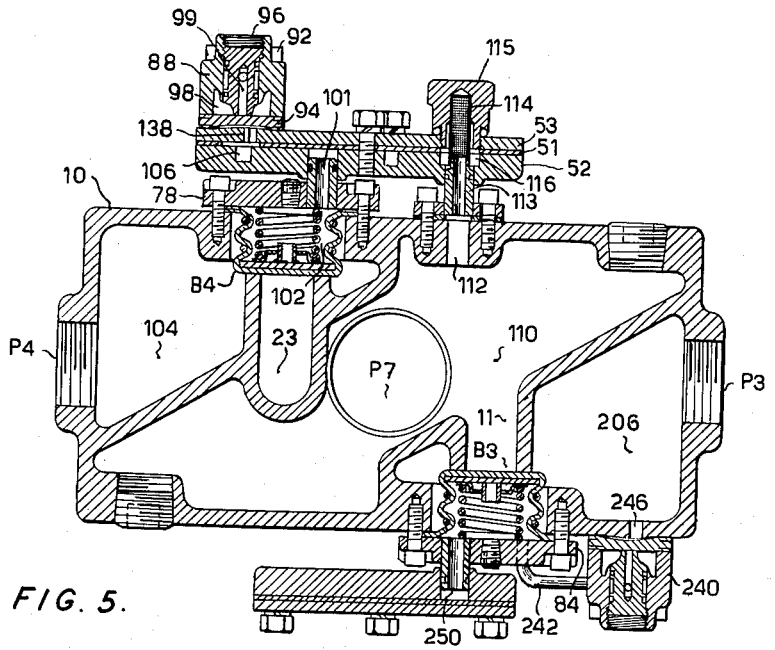
Figure 5 is a vertical section of the valve assembly taken on the surface the trace of which is indicated by 5—5 of Figure 3.

There is shown in Figure 18 an enlarged section of that part of the valve body shown in Figure 5 in which is mounted the valve B4. Figure 18 serves as a typical illustration of the manner in which a piston type valve may be substituted for the bellows type valve hereinbefore described. Referring to Figure 18 there is shown in section the valve body 10 into which is inserted the sleeve member 260 having an outwardly turned flange 261 which, with gaskets 262, is clamped between the valve body casting 10 and the valve cap 263. Mounted in the cap 263 is the plug member 264 supporting the guide rod 266 over which is slidably fitted the guide bushing 268. The O-ring 270 provides a liquid-tight seal between the guide rod 266 and the guide bushing 268. The guide bushing 268 is screwed into the threaded central bore 269 in the valve member 272.

The valve member 272 is formed as shown at 280 to provide a sliding fit within the sleeve member 260. The O-ring 282 provides a liquid seal between the valve portion 280 and the sleeve 260. The rubber valve face 274 is held in position by washer 276 which is, in turn, supported by the snap ring 278 which is mounted in a groove in the guide bushing 268. The spring 284 serves to urge the valve into a closed position when no pressure exists in chamber 23.

The operation of the piston type valve is identical to that of the bellows type valve. The major difference between the valves is in the cost of manufacture and details of the parts involved. Connecting fitting 101 serves to connect the valve chamber 102 with the top distributor plate, as shown in Figure 5 but not shown in Figure 18. When control liquid under pressure is admitted through connecting port 101 into chamber 102, pressure will be applied on the inside of the valve 272, the surface of which is of considerably greater area than the surface of the valve exposed to pressure within the chamber 23. Therefore, if these liquid pressures are the same the valve will be held firmly in a closed position, as has been hereinbefore described. When the connecting port 101 is connected to drain through the pilot valve, thus reducing the pressure of the liquid in chamber 102 to zero, the pressure in chamber 23 acting on the valve face 274 will cause the valve to open and allow a flow of liquid therethrough as has been hereinbefore described.

When the valve opens, the guide rod and bushing assembly 266 and 268 prevent the piston from rocking or jamming in the sleeve 260. The use of the guide rod and bushing assembly makes possible the use of a very shallow piston which can be used in a space comparable to that required by the previously described bellows type valve.

Also mounted in the cap 263 is the air vent member 288 containing the air vent screw 286 which, when screwed back out of the air vent member 288, permits the air in chamber 102 to escape as the chamber is filled with control liquid for the first time from the pilot valve. Once all the air has been removed from chamber 102 the air vent screw 286 is screwed tightly into the member 288, thereby sealing off the vent. It is obvious that this vent may be employed regardless of whether a piston type valve, a bellows valve or any other type valve structure is employed.

A further advantage of this valve structure, piston or bellows, is the speed with which the valve will open and close. When the pressure inside the bellows valve chamber 31 (Figure 2) drops to a value at which the total force acting inside the bellows face 33 is less than the total force acting on the outside of the bellows face as a result of the pressure in passage 32, the valve will begin to open as rapidly as the operating fluid inside the bellows chamber 31 can be discharged. As the valve opens and pressure begins to build up in chamber 49, the opening pressure is applied over a rapidly increasing area of the valve face. In the case of valves B1, B2, B3, and B5 where no flow rate control is provided, the opening rate becomes so rapid that restrictions 67, in the distributor plates, as shown in Figure 6, are provided in the drain line to reduce the rate of operation of the valves in order to prevent excessive shock or surges within the system.

It is obvious that for reasons of longer life, reduced restriction to flow, and improved conditions of control, this type valve is superior to the various types of valves heretofore employed.

It should be noted that the concentrated regenerant solution does not come in contact with any portion of the bellows valve or the pilot control valve and the diluted regenerant solution passing to drain through the bellows valve does not come in contact with the pilot control valve. Thus any corrosive effects which might otherwise impair the long life of trouble-free operation of the valve assembly are avoided.

The diaphragm of the rate controller is subjected to only very little motion. It is of sufficient section to have inherent stiffness enough to eliminate the need of a spring to return it to normal position when the pressure against its face is relieved. Unlike other rate controllers employing flow operated valves and other devices, the rate controller employed in this invention is of extremely simple and inexpensive construction and is readily accessible should examination be required. Thus its reliability is assured over long periods of use.

Figure 19 shows an entire liquid treatment plant including the liquid treatment tanks 14, control valves 10, eductor 26, regenerant measuring tank 12, weir pot 290, regenerant storage tank 292, float pot 294 and check valves and piping as will be described. While Figure 19 shows only two liquid treatment tanks in parallel arrangement, it will become obvious from the following description that any number of these tanks may be connected in parallel by simply extending the arrangement by connecting additional treatment tanks to the various pipe lines cut off at the right-hand side of the figure. Each of the liquid treatment tanks and its associated control valve operates as has been described and is connected to the system in the following manner:

The raw water requiring treatment is supplied to the system through pipe line header 300 and through the branch 16 to the control valve 10 serving the liquid treatment tank 14. Inserted in the branch line 16 is the check valve 302 which prevents any possible reverse flow from the valve 10 back into the raw water inlet header 300. Emerging from the control valve 10 is the service line 22, which is connected through a flow meter 304 and a check valve 306 to the common softened water outlet or service pipe header 308. The flow meter, which may be a conventional type of meter, indicates the volume of liquid which has been treated and thus indicates when the treatment tank requires regeneration.

As has been hereinbefore described pipe line 21 connects the bottom of the liquid treatment tank to the control valve and lines 24 and 28, containing orifice members 216 and 218, respectively, lead to the drain line 310. The line 314 leading to drain in Figure 19 is connected to the port P8 which, as shown in Figures 4 and 6, provides the drain required for the fluids employed in the operation of the pilot valve control.

Line 312 connects the control valve through check valve 314 to the common header 316 leading to the eductor 26. During the regeneration cycle liquid passes from the control valve through lines 312 and 316 and the eductor 26 into the common header 318, and from the common header 318 through check valve 333 and pipe line 334 into the liquid treatment tank.

Also connecting the top of the liquid treatment tank with the control valve assembly is line 18 which carries the normal service flow of water from the control valve to the treatment tank, and the backwash flow from the tank to the control valve as has been hereinbefore described. The normal service flow passes from pipe line 18 through the fitting 329 and enters the top of the liquid treatment tank through pipe line 330 from which it passes to and flows over the rim of the distributor plate 332. The regenerant solution entering the top of the liquid treatment tank through pipe line 334 passes through the pipe line 334 and through the fitting 336 into the radially arranged perforated pipes 338 which provide a well distributed input flow over the surface of the liquid treating material or filter bed 339.

Considering the problem of possible reverse, circulating or otherwise undesirable flow in any of the four common headers, namely, the raw water supply header 300, the header 316 leading from the control valve 10 to the eductor 26, the header 318 leading from the eductor 26 to the tops of the liquid treatment tanks, and the softened water outlet header 308, it will be observed that liquid flow from any of the control valves 10 back to the inlet header 300 is prevented by the check valves 302. Liquid flow from the service outlet header 308 back to any of the control valves is blocked by the check valves 306. Liquid flow from the header 316 leading to the eductor 26 back to any of the control valves is prevented by the check valves 314. Liquid flow from any of the liquid treatment tanks back into the header 318 is prevented by the check valves 333. Regenerant flow from header 318 into liquid treatment tanks other than the one undergoing treatment will be prevented by virtue of the fact that the pressure drop through the eductor has reduced the pressure existing in line 318 to a value below that of the pressure existing in liquid treatment tanks undergoing any cycle other than regeneration. Therefore, the check valve 333 will have applied to it from the liquid treatment tank a pressure in excess of that applied to it from the header 318. Therefore, regenerant flow from the header 318 can take place only into the proper liquid treatment tank.

The regenerant supply system involves the regenerant tanks and the float and weir pots. Supply liquid is admitted into the regenerant storage tank 292 through the pipe line 340, valve assembly housing 342, float pot 294 and pipe line 344. The float pot 294 and the valve assembly 342 are shown in an enlarged sectional view in Figure 21. Referring to Figure 21, there is shown the float pot 294 containing a float ball 346 affixed to a rod 348 which is slidably mounted within a bushing 350. The bushing member 350 is threaded into the plug 352 which is mounted in the base of the float pot 294.

Mounted within the valve housing 342 is the diaphragm 354. Mounted in the center of the diaphragm is the member 356 containing a central bore 358. The spring 360 bearing against the member 357 urges the diaphragm against the end of the sleeve member 362 which, except for the flow through bore 358 into the chamber 364, blocks the inlet flow from pipe 340 through sleeve member 362. The sliding valve member 366 lies in chamber 368 which is connected by means of passage 370 to chamber 364. Chamber 368 is connected through passages 372 and 374 to the interior of the float pot 294. One end of rod member 376 passes through bore 378 in the rod 348. The other end of the rod 376 is formed with a head 380 which bears against one end of member 382.

The purpose of the float pot assembly is to control the liquid level in the regenerant storage tank. It will be obvious that as a result of the interconnection between the float pot and the storage tank through pipe line 344 the liquid level will be the same in each. Therefore, by controlling the shut-off valve with the float 346 in the float pot, the liquid level within the regenerant tank will be controlled.

Assuming the liquid level to be below the desired level the float 346 will not be supported by the liquid in the float pot and the rod 348 will be in its lowermost position, the rod 376 will be approximately horizontal and the valve member 366 will be in the position as shown. Under these conditions the liquid entering through pipe 340 and sleeve 362 will apply sufficient force against the member 356 to compress the spring 360 and thus open the diaphragm valve allowing a flow of liquid to pass from within the sleeve 362 into chambers 365 and 374, through the openings 355 in the diaphragm 354 and into the float pot. When the liquid in the float pot and the regenerant storage tank reaches a predetermined level established by the position of the float ball 346, the float ball floating on the surface of the liquid will lift the rod 348 and the end of rod 376 passing therethrough, causing the head 380 of the rod 376 to rotate about a point of contact between the lower edge of the head 380 and the member 382, thereby causing the central portion of the head 380 to bear against one end of valve member 366 forcing the other end of valve member 366 into the passage 370, thereby sealing off the passage 370. When the passage 370 is sealed off it will be obvious that the liquid flowing through the passage 358 into the chamber 364 will build up a pressure within the chamber 364 which is equal to the pressure existing within the sleeve member 362. Therefore, due to the fact that the same pressure which is being applied over the relatively small area of the surface of the member 356 is being applied over the relatively large area of the diaphragm valve exposed to the pressure within the chamber 364, the diaphragm valve will be forced to bear against the end of the sleeve 362 thereby closing off all inlet flow.

When there is a demand for regenerant fluid, lowering the level of the liquid within the regenerant storage tank and similarly within the float pot, the float 346, the rod 348 and the rod 376 will be lowered, returning the head 380 of the rod 376 to a more nearly vertical position thereby allowing the valve 366 to back away from and open the end of passage 370. When this occurs the pressure in chamber 364 will be reduced to the relatively low pressure existing within the float pot and existing within chamber 365. Under these conditions the comparatively high pressure of the liquid within the sleeve 362 bearing against the member 356 will cause the diaphragm valve to open, as has been previously described.

Regenerant liquid flowing from the regenerant storage tank 292 into the regenerant measuring tank 12 passes under the inverted pan 386 through pipe line 388, weir pot 290 and pipe line 390. The function of the weir pot is to prevent regenerant flow between the storage tank to the measuring tank during certain intervals. When the weir pot allows a flow to take place, it is obvious that the liquid level in the regenerant measuring tank and the weir pot will be identical with the liquid level within the regenerant storage tank and the float pot. When any one of the liquid treatment tanks is, as a result of operation of the control valve assembly, engaged in a regenerating cycle, the liquid flowing from the control valve assembly through the eductor 26 will cause regenerant solution to be drawn from the regenerant measuring tank 12 through pipe line 27 and check valve 317 into the eductor 26 mixing therein with the fluid flowing from the control valve and passing into the header pipe 318 and to the particular liquid treatment tank undergoing regeneration. In order that a predetermined quantity of regenerant fluid may be employed in a regeneration cycle the regenerant measuring tank, which may be provided with a float gauge or other indicating means, not shown, must not have regenerant liquid supplied to it during a regeneration cycle. It is the purpose of the weir pot assembly to prevent the flow of regenerant liquid from the storage tank to the measuring tank during the regeneration of any of the liquid treatment tanks.

The weir pot assembly is shown in an enlarged section in Figure 20 and contains the bellows valve 392, the valve seat and supporting member 394 which is mounted on the pipe nipple 396 which is screwed into the threaded bore 398 in the weir pot and connects with pipe line 390.

Connected to the bellows valve 392 is the rod 400 which is urged upwardly by the action of the spring 402 acting upon the jam nuts 404 through the disc member 406. Spring 402 is mounted within the central bore 408 of the member 410. Also connected to the member 410 and supplying liquid pressure to the chamber 408 is the pipe line 25. When none of the liquid treatment tanks are undergoing a regenerant cycle, the pressure within pipe lines 316 and 25 will be essentially zero, therefore, the pressure in chamber 408 and the pressure acting against the inside of the bellows valve 392 in the weir pot will also be essentially zero, and the spring 402 will hold the valve in an open position. With the valve in an open position, regenerant liquid is free to flow from the regenerant storage tank through pipe line 388 into the weir pot, past the open bellows valve 392 and through pipe nipple 396 into pipe line 390 to the regenerant measuring tank.

The effect of this flow will be to lower the level of the liquid in the regenerant storage tank, at which time the float pot valve assembly will operate, as has been described, and liquid from pipe line 340 will pass through the float valve assembly into the regenerant storage tank until the liquid in the regenerant measuring tank, the weir pot, the regenerant storage tank and the float pot has reached the predetermined level as established by the float valve assembly. The gravity flow of the liquid from the storage tank to the measuring tank is sufficiently slow to avoid channelling the salt or other material used in preparing the regenerant in the regenerant storage tank.

When any of the liquid treatment tanks call for regenerant solution, a pressure will exist in pipe line 25, which is equal to the pressure in pipe line 316 leading to the eductor 26 and will close the bellows valve 392 allowing regenerant solution to be withdrawn from the regenerant measuring tank with no replacement thereof until the termination of the regenerating cycle.

What I claim and desire to protect by Letters Patent is:

1. A liquid handling apparatus comprising a liquid treatment tank having an inlet and an outlet, a regenerant tank, an eductor, drain means, a multiport liquid flow control assembly, a liquid supply line connected to said flow control assembly, a liquid service line connected to a first port of said flow control assembly, a liquid flow connection between a second port of said flow control assembly and the treatment tank inlet, a liquid flow connection between a third port of said flow control assembly and said eductor, a liquid flow connection between said eductor and the treatment tank, a liquid flow connection between said regenerant tank and said eductor, a liquid flow connection between a fourth fort of said flow control assembly and the treatment tank outlet, a liquid flow connection between a fourth port of said flow control assembly and said drain means, port interconnecting passages within said flow control assembly, and means controlling said flow control assembly to selectively direct a flow of liquid from said supply line through said flow control assembly and said second mentioned port thereof to said treatment tank and from said treatment tank through said flow control assembly and said fourth and first mentioned ports thereof to said service line, and to shutoff flow through all of said flow control assembly ports except the second mentioned port thereof connected to the treatment tank inlet.

2. A liquid handling apparatus comprising a liquid treatment tank having an inlet and an outlet, a regenerant tank, an eductor, drain means, a multiport liquid flow control assembly including hydraulically operated valve means for controlling flow through each of the ports thereof and means directing the hydraulic operating flow to said valve means, a liquid supply line connected to said flow control assembly, a liquid service line connected to a first port of said flow control assembly, a liquid flow connection between a second port of said flow control assembly and the treatment tank inlet, a liquid flow connection between a third port of said flow control assembly and said eductor, a liquid flow connection between said eductor and the treatment tank, a liquid flow conection between said regenerant tank and said eductor, a liquid flow connection between a fourth port of said flow control assembly and the treatment tank outlet, a liquid flow connection between a fifth port of said flow control assembly and said drain means, port interconnecting passages within said flow control assembly, said flow control assembly operating to control liquid flow through said connections, said hydraulic operating flow being independent of and isolated from the liquids flowing through said control assembly ports, said flow control assembly including means responsive to the liquid pressure in said fifth mentioned port to control the hydraulic operating pressure imposed on the valve controlling the rate of liquid flow through said fifth mentioned port.

3. A liquid handling apparatus comprising a tank having an inlet and an outlet, a liquid flow control assembly including fluid operated valve means for controlling flow through said assembly, means directing operating fluid to said valve means and an operating fluid drain for said valve means, a liquid supply line connected to said flow control assembly, a liquid service line connected to said flow control assembly, a liquid drain line connected to said flow control assembly, liquid flow connections between said flow control assembly and said tank inlet, and between said flow control assembly and said tank outlet, said flow control assembly operating to control liquid flow through said connections, and said fluid operated valve means including means in its drain controlling the pressure of the operating fluid imposed on the valve means controlling the flow of fluid through said flow control assembly to drain.

4. A liquid handling apparatus comprising a tank having an inlet and an outlet, a liquid flow control assembly including fluid operated diaphragm valve means for controlling flow through said assembly, means direciting operating fluid to said valve means and an operating fluid drain for said valve means, a liquid supply line connected to said flow control assembly, a liquid service line connected to said flow control assembly, a liquid drain line connected to said flow control assembly, liquid flow connections between said flow control assembly and said tank inlet, and between said flow control assembly and said tank outlet, said flow control assembly operating to control liquid flow through said connections, and said fluid operated valve means including means in its drain controlling the pressure of the operating fluid imposed on the valve means controlling the flow of fluid through said flow control assembly to drain.

5. A liquid handling apparatus comprising a tank having an inlet and an outlet, a liquid flow control assembly including fluid operated valve means for controlling flow through said assembly and means directing operating fluid to said valve means, a liquid supply line connected to said flow control assembly, a liquid service line connected to said flow control assembly, a liquid drain for said flow control assembly, liquid flow connections between said flow control assembly and said tank inlet, and between said flow control assembly and said tank outlet, said flow control assembly operating to control liquid flow through said connections, and said flow control assembly including means responsive to the liquid pressure in its drain to control the pressure of the operating fluid imposed on the valve means controlling the flow of liquid through said flow control assembly to drain.

6. A liquid handling apparatus comprising a tank having an inlet and an outlet, a liquid flow control assembly including fluid operated diaphragm valve means for controlling flow through said assembly and means directing operating fluid to said valve means, a liquid supply line connected to said flow control assembly, a liquid service line connected to said flow control assembly, a liquid drain for said flow control assembly, liquid flow connections between said flow control assembly and said tank inlet, and between said flow control assembly and said tank outlet, said flow control assembly operating to control liquid flow through said connections, and said flow control assembly including means responsive to the liquid pressure in its drain to control the pressure of the operating fluid imposed on the valve means controlling the flow of liquid through said flow control assembly to drain.

7. A liquid handling apparatus comprising a tank having an inlet and an outlet, a liquid flow control assembly including fluid operated valve means for controlling flow through said assembly, means directing operating fluid to through said assembly, means directing operating fluid to said valve means and means for draining operating fluid from said valve means, a liquid supply line connected to said flow control assembly, a liquid service line connected to said flow control assembly, a liquid drain line connected to said flow control assembly, liquid flow lines connected between said flow control assembly and said tank inlet, and between said flow control assembly and said tank outlet, said flow control assembly operating to control liquid flow through said lines, and said fluid operated valve means including means in the drain for its operating fluid for controlling the pressure of the operating fluid imposed on the valve means controlling the flow of fluid through said flow control assembly to said drain line.

8. A liquid handling apparatus comprising a tank having an inlet and an outlet, a liquid flow control assembly including fluid operated diaphragm valve means for controlling flow through said assembly, means directing operating fluid to said valve means and means for draining operating fluid from said valve means, a liquid supply line connected to said flow control assembly, a liquid service line connected to said flow control assembly, a liquid drain line connected to said flow control assembly, liquid flow lines connected between said flow control assembly and said tank inlet, and between said flow control assembly and said tank outlet, said flow control assembly operating to control liquid flow through said lines, and said fluid operated valve means including means in the drain for its operating fluid for controlling the pressure of the operating fluid imposed on the valve means controlling the flow of fluid through said flow control assembly to said drain line.

9. A liquid handling apparatus comprising a tank having an inlet and an outlet, a liquid flow control assembly including fluid operated valve means for controlling flow through said assembly and means directing operating fluid to said valve means, a liquid supply line connected to said flow control assembly, a liquid service line connected to said flow control assembly, a liquid drain opening in said flow control assembly, liquid flow lines connected between said flow control assembly and said tank inlet, and between said flow control assembly and said tank outlet, said flow control assembly operating to control liquid flow through said lines, and said flow control assembly including means responsive to the pressure of liquid flowing to said drain opening to control the pressure of the operating fluid imposed on the valve means controlling the flow of liquid through said flow control assembly to said drain opening.

10. A liquid handling apparatus comprising a tank having an inlet and an outlet, a liquid flow control assembly including fluid operated diaphragm valve means for controlling flow through said assembly and means directing operating fluid to said valve means, a liquid supply line connected to said flow control assembly, a liquid service line connected to said flow control assembly, a liquid drain opening in said flow control assembly, liquid flow connections between said flow control assembly and said tank inlet, and between said flow control assembly and said tank outlet, said flow control assembly operating to control liquid flow through said lines, and said flow control assembly including means responsive to the pressure of liquid flowing to said drain opening to control the pressure of the operating fluid imposed on the valve means controlling the flow of liquid through said flow control assembly to said drain opening.

11. A liquid handling apparatus comprising a plurality of liquid treatment tanks each having an inlet and an outlet, a plurality of liquid flow control assemblies each operatively connected to one of said tanks, a regenerant tank, a single eductor, a liquid supply line connected to each of said flow control assemblies, a liquid service line connected to each of said flow control assemblies, a liquid drain line connected to each of said flow control assemblies, liquid flow connections between each of said flow control assemblies and the inlet and the outlet of its liquid treatment tank, a liquid flow connection between said regenerant tank and the suction inlet to said eductor, liquid flow connections between said eductor and each of said flow control assemblies, liquid flow connections between said eductor and the inlet side of each of said treatment tanks, and means controlling each of said flow control assemblies to control the flow of liquid from its liquid supply line to said eductor, to connect its treatment tank outlet to drain and to shut off the flow connection to the inlet side of its treatment tank, the liquid pressure differences within the apparatus preventing flow from said eductor to any treatment tank other than a treatment tank associated with a flow control assembly delivering fluid flow to said eductor.

12. A liquid handling apparatus comprising a liquid treatment tank having an inlet and an outlet, a regenerant storage tank, an eductor, a unitary multiport liquid flow control valve assembly, a liquid supply line connected to said control valve assembly, a liquid service line connected to said control valve assembly, a liquid drain line connected to said control valve assembly, liquid flow lines connected between said control valve assembly and said treatment tank inlet, said treatment tank outlet and said eductor, and between said regenerant tank and said eductor, said control valve assembly including passages for liquid flow between lines connected thereto including passages connecting said supply line to the line connected to said treatment tank inlet and connecting the line connected to said treatment tank outlet to said service line and to said drain line, and said control valve assembly including means for selectively controlling flow through each of said passages and means for selectively actuating said flow controlling means to provide for flow from said supply line through said treatment tank to said service line and to provide for simultaneous shutoff of flow through all of said lines except flow from said treatment tank outlet to said drain line.

13. A liquid handling apparatus comprising a liquid treatment tank having an inlet and an outlet, a regenerant storage tank, an eductor, a unitary multiport liquid flow control valve assembly, a liquid supply line connected to said control valve assembly, a liquid service line connected to said control valve assembly, a liquid drain line connected to said control valve assembly, liquid flow lines connected between said control valve assembly and said treatment tank inlet, said treatment tank outlet and said eductor, and between said regenerant tank and said eductor, said control valve assembly including passages for liquid flow between lines connected thereto including passages connecting said supply line to the line connected to said treatment tank inlet and connecting the line connected to said treatment tank outlet to said service line, and said control valve assembly including means for selectively controlling flow through each of said passages and means for selectively actuating said flow controlling means to provide for flow from said supply line through said treatment tank to said service line and to provide for simultaneous shutoff of flow through all of said lines except flow from said supply line to said treatment tank inlet.

14. A liquid handling apparatus comprising a tank having an inlet and an outlet, a unitary multiport liquid flow control assembly, a liquid supply line connected to said flow control assembly, a liquid service line connected to said flow control assembly, a liquid drain line connected to said flow control assembly, liquid flow lines connected between said flow control assembly and said tank inlet and said tank outlet, said flow control assembly including means connecting said lines and means providing control of flow through each of said lines, and means for controlling the rate of flow of liquid flowing through the lines connected between said flow control assembly and said drain means, said flow rate controlling means including means responsive to pressure of the liquid in the flow control assembly on the downstream side of the drain line flow controlling means for controlling the operation of the drain line flow controlling means to control the rate of flow therethrough, said flow rate controlling means being actuated immediately upon initiation of flow through said liquid flow control assembly to drain by drain flow liquid pressure independent of the pressure of the liquid in said supply line.

15. A liquid handling apparatus comprising a tank having an inlet and an outlet, a unitary multiport liquid flow control assembly, a liquid supply line connected to said flow control assembly, a liquid service line connected to said flow control assembly, two liquid drain lines connected to said flow control assembly, liquid flow lines connected between said flow control assembly and said tank inlet and said tank outlet, said liquid flow control assembly including means connecting said lines and means providing control of flow through each of said lines and providing, selectively, flow from said supply line through the liquid flow lines connected to said tank to said service line, flow from said supply line through the liquid flow lines connected to said tank to a first of said drain lines, and flow from said supply line through the liquid flow lines connected to said tank in a reverse direction to a second of said drain lines, and independent means for controlling the rates of flow of liquid flowing from said flow control assembly to each of said drain lines, each of said flow rate controlling means including means responsive to pressure of the liquid in the flow control assembly on the downstream side of the drain line flow controlling means for controlling the operation of the drain line flow controlling means to control the rate of flow therethrough, said flow rate controlling means being actuated immediately upon initiation of flow through said liquid flow control assembly to its drain line by drain flow liquid pressure independent of the pressure of the liquid in said supply line.

References Cited in the file of this patent

UNITED STATES PATENTS

| Number | Name | Date |
|---|---|---|
| Re. 23,076 | Pick | Jan. 11, 1949 |
| 1,652,710 | Dotterweich | Dec. 13, 1927 |
| 1,718,244 | Marsh et al. | June 25, 1929 |
| 1,784,892 | Duden | Dec. 16, 1930 |
| 2,036,634 | Inch | Apr. 7, 1936 |
| 2,051,155 | Staegemann | Aug. 18, 1936 |
| 2,153,559 | Hendricks | Apr. 11, 1939 |
| 2,180,320 | Hansen | Nov. 14, 1939 |
| 2,188,850 | Zinkil et al. | Jan. 30, 1940 |
| 2,192,835 | Leach | Mar. 5, 1940 |
| 2,209,296 | Jewell et al. | July 23, 1940 |
| 2,240,171 | Brice et al. | Apr. 29, 1941 |
| 2,243,815 | Griswold | May 27, 1941 |
| 2,265,520 | Eickmeyer et al. | Dec. 9, 1941 |
| 2,292,801 | Slidell | Aug. 11, 1942 |
| 2,309,032 | Zimmerman | Jan. 19, 1943 |
| 2,315,223 | Riche | Mar. 30, 1943 |
| 2,354,694 | McGill et al. | Aug. 1, 1944 |
| 2,460,011 | Hungerford et al. | Jan. 25, 1949 |
| 2,596,915 | Pick | May 13, 1952 |